(12) United States Patent
Thomas et al.

(10) Patent No.: US 12,506,942 B2
(45) Date of Patent: Dec. 23, 2025

(54) MOUNTS FOR IMAGE CAPTURE DEVICES AND METHODS OF INHIBITING DISASSEMBLY

(71) Applicant: GoPro, Inc., San Mateo, CA (US)

(72) Inventors: Matthew David Thomas, Castro Valley, CA (US); Matthew Craig Feddersen, Scotts Valley, CA (US); Bessy Wen-Han Liang, San Jose, CA (US); John George Muhlenkamp, IV, Mapleton, UT (US); Joseph Tucker, Santa Cruz, CA (US); Huy Phuong Nguyen, Alpine, UT (US)

(73) Assignee: GoPro, Inc., San Mateo, CA (US)

( * ) Notice: Subject to any disclaimer, the term of this patent is extended or adjusted under 35 U.S.C. 154(b) by 346 days.

(21) Appl. No.: 18/229,357

(22) Filed: Aug. 2, 2023

(65) Prior Publication Data
US 2024/0048829 A1 Feb. 8, 2024

Related U.S. Application Data

(60) Provisional application No. 63/394,759, filed on Aug. 3, 2022.

(51) Int. Cl.
*H04N 5/225* (2006.01)
*H01R 13/639* (2006.01)
*H04N 23/54* (2023.01)

(52) U.S. Cl.
CPC ........... *H04N 23/54* (2023.01); *H01R 13/639* (2013.01)

(58) Field of Classification Search
CPC .............................. H04N 23/54; H01R 13/639
See application file for complete search history.

(56) References Cited

U.S. PATENT DOCUMENTS

| | | | | | |
|---|---|---|---|---|---|
| 4,734,874 | A | * | 3/1988 | Hwang | H01R 13/627 361/679.61 |
| 4,903,325 | A | * | 2/1990 | Yoshitake | H04M 1/6075 455/575.9 |
| 5,834,920 | A | * | 11/1998 | Daniel | H04M 1/0262 320/111 |
| 12,189,276 | B2 | * | 1/2025 | Tonokawa | G03B 17/566 |
| 12,189,277 | B2 | * | 1/2025 | Griggs | G03B 17/561 |
| 2022/0321751 | A1 | * | 10/2022 | Zeng | H04N 23/531 |
| 2023/0174197 | A1 | * | 6/2023 | Swaney | B63B 49/00 396/419 |

* cited by examiner

*Primary Examiner* — Neil Abrams
(74) *Attorney, Agent, or Firm* — Young Basile Hanlon & MacFarlane, P.C.

(57) ABSTRACT

A mount (coupler) is disclosed that is configured to connect an image capture device to an accessory. The mount includes a female component that is configured for connection to the accessory and which defines stops, and a male component that is configured for removable insertion into the female component. The male component includes: a body; arms that are supported by the body and which are configured for engagement with the stops to thereby connect the male component to the female component; and a power hub that is supported by the body and which is configured to receive a power cord along a longitudinal axis to thereby deliver power and/or data to the mount. The male component is configured for disconnection from the female component upon deflection of the arms beyond a threshold release distance that is less than a maximum transverse (e.g., horizontal) cross-sectional dimension defined by the power cord.

20 Claims, 14 Drawing Sheets

MOUNTS FOR IMAGE CAPTURE DEVICES AND METHODS OF INHIBITING DISASSEMBLY

CROSS-REFERENCE TO RELATED APPLICATION(S)

This application claims the benefit of and priority to U.S. Provisional Patent Application Ser. No. 63/394,759, filed on Aug. 3, 2022, the entire contents of which are hereby incorporated by reference.

TECHNICAL FIELD

The present disclosure relates to a mount (coupler) that is configured to releasably connect an image capture device (e.g., a camera, a video recorder, a cell phone, etc.) to an accessory or another product (e.g., a vest, a glove, a helmet, a hat, a tripod, a hand-held apparatus, a power supply, a vehicle, a bicycle, a surfboard, etc.), as well as to the communication of power and/or data to and/or from the image capture device. More specifically, the mount described herein includes a female component and a male component with an integrated power hub that is configured for connection to a power cord (e.g., a USB cable) such that, upon connection, the power cord inhibits (if not entirely prevents) separation of the female and male components and, thus, disconnection of the image capture device from the accessory.

In order to facilitate the communication of power and/or data to and/or from the image capture device (e.g., via, through the mount), the image capture device and the mount include corresponding electrical interfaces that are configured for contact upon the connection thereof.

BACKGROUND

Mounts, couplers, and the like are widely used to connect image capture devices to a variety of accessories and typically include female and male components that are configured for releasable engagement. While certain mounts include an anti-disconnection feature that inhibits disengagement of the female and male components, a need remains for a mount including an anti-disconnection feature that also facilitates the communication of power and/or data to the mount and the image capture device connected thereto, which is addressed by the present disclosure.

SUMMARY

In one aspect of the present disclosure, a mount is disclosed that is configured to connect an image capture device to an accessory. The mount includes a female component that is configured for connection to the accessory and a male component that is configured for removable insertion into the female component. The male component includes: a body; a first interconnect mechanism that is supported by the body and which is configured to interface with a second interconnect mechanism on the image capture device to facilitate removable connection of the image capture device to the mount; deflectable arms that are supported by the body and which are resiliently repositionable between an engaged position, in which the deflectable arms engage the female component to thereby connect the male component and the female component, and a disengaged position, in which the deflectable arms are disengaged from the female component to allow for disconnection of the male component from the female component; and a power hub that is supported by the body and which is configured to receive a power cord to thereby deliver power and/or data to the mount. The power hub is located between the deflectable arms such that, upon connection of the power cord to the power hub, the power cord inhibits repositioning of the deflectable arms from the engaged position into the disengaged position to thereby maintain connection of the male component and the female component.

In certain embodiments, the first interconnect mechanism may include first fingers that extend from the male component, and which define channels therebetween.

In certain embodiments, the second interconnect mechanism may include second fingers that extend from the image capture device and which are configured for insertion into the channels.

In certain embodiments, the male component may be configured such that the deflectable arms define vertical uppermost surfaces that are generally aligned with a lower end of the power hub to thereby reduce an overall height of the male component.

In certain embodiments, the male component may be configured for disconnection from the female component upon deflection of the deflectable arms beyond a threshold release distance that is less than a maximum transverse (e.g., horizontal) cross-sectional dimension defined by the power cord.

In certain embodiments, the male component may be configured such that the threshold release distance is approximately 6 mm.

In certain embodiments, the male component may be configured for slidable insertion into the female component along a first axis.

In certain embodiments, the power hub may be configured such that the power cord is connectable thereto via advancement along a second axis that extends in generally parallel relation to the first axis.

In certain embodiments, the female component may include stops and the deflectable arms may include locking members that are configured for engagement with the stops when the deflectable arms are in the engaged position to thereby inhibit removal of the male component from the female component.

In certain embodiments, the power hub may define an end wall that is spaced inwardly from the locking members along the second axis.

In certain embodiments, the locking members may be positioned laterally outward of the power hub.

In another aspect of the present disclosure, a mount is disclosed that is configured to connect an image capture device to an accessory. The mount includes a female component that is configured for connection to the accessory and a male component that is configured for removable insertion into the female component. The male component includes: a body; a first interconnect mechanism that is supported by the body and which is configured to interface with a corresponding second interconnect mechanism on the image capture device to facilitate removable connection of the image capture device to the mount; arms that are supported by the body and which are configured to releasably connect the male component to the female component; and a power hub that is supported by the body and which is configured to receive a power cord to thereby deliver power and/or data to the mount.

In certain embodiments, the power hub may include a first electrical contact that is configured for engagement with a second electrical contact on the power cord to thereby facilitate power and/or data delivery to the mount.

In certain embodiments, the arms may be resiliently deflectable between an engaged position, in which the arms secure the male component within the female component, and a disengaged position, in which the male component is removable from the female component.

In certain embodiments, the power hub may be positioned such that, upon connection of the power cord to the power hub, the power cord inhibits repositioning of the arms from the engaged position into the disengaged position.

In certain embodiments, the power hub may be located between the arms.

In another aspect of the present disclosure, a mount is disclosed that is configured to connect an image capture device to an accessory such that the image capture device is movable in relation to the mount about an articulation joint. The mount and the image capture device include corresponding electrical interfaces that are configured to facilitate power and/or data communication to and/or from the image capture device through the articulation joint upon connection of the mount and the image capture device.

In certain embodiments, the corresponding electrical interfaces may include a first electrical interface, and a second electrical interface that is configured for direct contact with the first electrical interface.

In certain embodiments, the first electrical interface may include contact pads, and the second electrical interface may include connector pins that are configured for engagement with the contact pads.

In certain embodiments, the first electrical interface may be included on the image capture device, and the second electrical interface may be included on the mount.

In certain embodiments, the second electrical interface may be reconfigurable between an expanded configuration and a compressed configuration.

In certain embodiments, the second electrical interface may be biased towards the expanded configuration such that a biasing force is created in the second electrical interface upon connection of the image capture device and the mount that maintains electrical connection of the first electrical interface and the second electrical interface while allowing for relative movement between the image capture device and the mount.

BRIEF DESCRIPTION OF THE DRAWINGS

The present disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

The present disclosure describes an accessory mounting system including a mount that is configured to connect an image capture device to an accessory. The mount includes a female component that is configured for connection to the accessory and a male component that is configured for removable insertion into the female component The male component includes arms that are resiliently repositionable (deflectable) between an engaged position and a disengaged position and an integrated power hub that is configured to receive a power cord to thereby facilitate power and/or data delivery to the mount.

In the engaged position, locking members on the arms engage (contact) stops on the female component, which secures the male component within the female component (e.g., such that the male component is non-removably positioned within the female component). By contrast, in the disengaged position, the locking members are disengaged (separated) from the stops, which allows for disassembly of the mount via removal of the male component from the female component.

The power hub is located between the deflectable arms such that, upon connection of the power cord to the power hub, the power cord interferes with deflection of the arms and, thus, repositioning of the arms from the engaged position into the disengaged position, so as to maintain (preserve) connection of the male component and the female component and assembly of the mount. It is envisioned that the power cord may be connected to any suitable source of power including, for example, a battery pack, an accessory with an integrated power supply, the battery or the electrical system in a vehicle, etc.

In order to facilitate power and/or data communication to and/or from the image capture device, it is envisioned that the mount and the image capture device may include corresponding electrical interfaces that are configured for direct contact upon connection of the image capture device and the mount. For example, in one embodiment, the electrical interfaces include corresponding contact pads and connector pins.

Figure 1A:
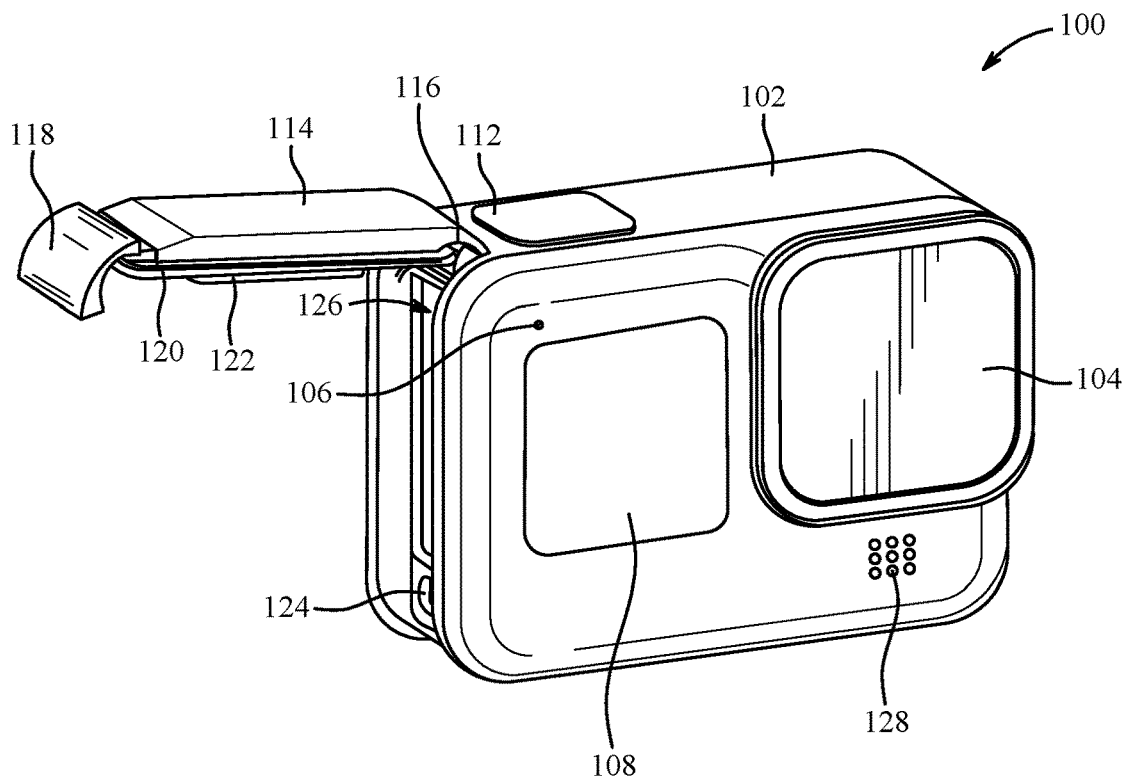
FIGS. 1A-B are isometric views of an example of an image capture device.
Figure 1B:
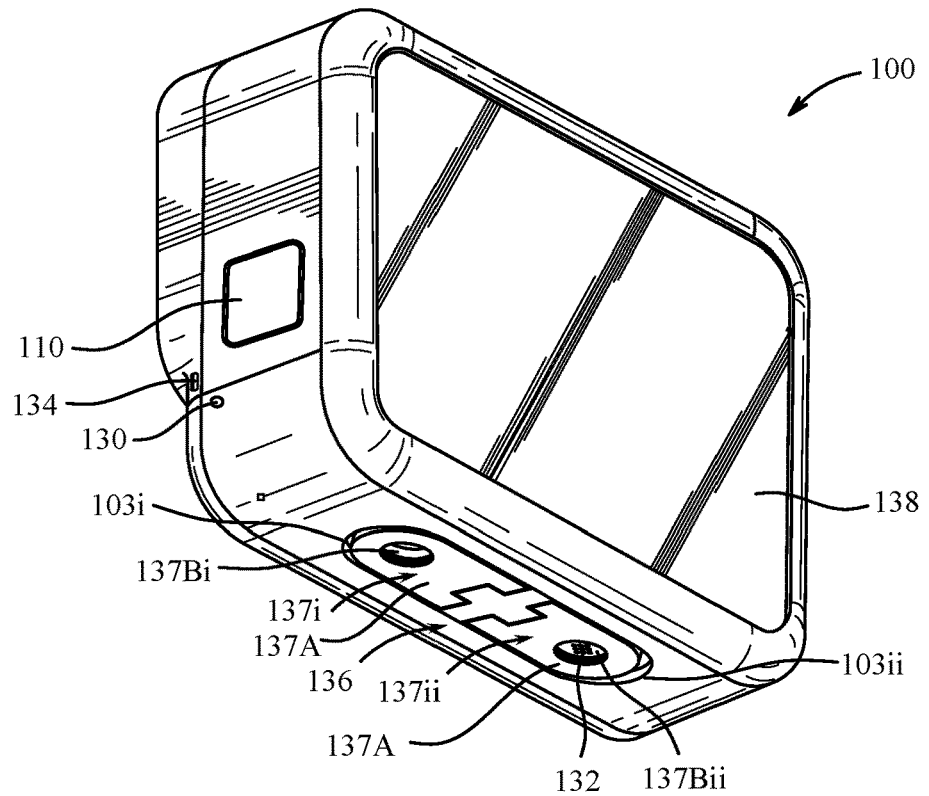

FIG. 1A and FIG. 1B are isometric views of an example of an image capture device 100. The image capture device 100 may include a body 102, a lens 104 structured on a front surface of the body 102, various indicators on the front surface of the body 102 (such as light-emitting diodes (LEDs), displays, and the like), various input mechanisms (such as buttons, switches, and/or touch-screens), and electronics (such as imaging electronics, power electronics, etc.) internal to the body 102 for capturing images via the lens 104 and/or performing other functions. The lens 104 is configured to receive light incident upon the lens 104 and to direct received light onto an image sensor internal to the body 102. The image capture device 100 may be configured to capture images and video and to store captured images and video for subsequent display or playback.

The image capture device 100 may include an LED or another form of indicator 106 to indicate a status of the image capture device 100 and a liquid-crystal display (LCD) or other form of a display 108 to show status information such as battery life, camera mode, elapsed time, and the like. The image capture device 100 may also include a mode button 110 and a shutter button 112 that are configured to allow a user of the image capture device 100 to interact with the image capture device 100. For example, the mode button 110 and the shutter button 112 may be used to turn the image capture device 100 on and off, scroll through modes and settings, and select modes and change settings. The image capture device 100 may include additional buttons or interfaces (not shown) to support and/or control additional functionality.

The image capture device 100 may include a door 114 coupled to the body 102, for example, using a hinge mechanism 116. The door 114 may be secured to the body 102 using a latch mechanism 118 that releasably engages the body 102 at a position generally opposite the hinge mechanism 116. The door 114 may also include a seal 120 and a battery interface 122. When the door 114 is an open position, access is provided to an input-output (I/O) interface 124 for connecting to or communicating with external devices as described below and to a battery receptacle 126 for placement and replacement of a battery (not shown). The battery receptacle 126 includes operative connections (not shown) for power transfer between the battery and the image capture device 100. When the door 114 is in a closed position, the seal 120 engages a flange (not shown) or other interface to provide an environmental seal, and the battery interface 122 engages the battery to secure the battery in the battery receptacle 126. The door 114 can also have a removed position (not shown) where the entire door 114 is separated from the image capture device 100, that is, where both the hinge mechanism 116 and the latch mechanism 118 are decoupled from the body 102 to allow the door 114 to be removed from the image capture device 100.

The image capture device 100 may include a microphone 128 on a front surface and another microphone 130 on a side surface. The image capture device 100 may include other microphones on other surfaces (not shown). The microphones 128, 130 may be configured to receive and record audio signals in conjunction with recording video or separate from recording of video. The image capture device 100 may include a speaker 132 on a bottom surface of the image capture device 100. The image capture device 100 may include other speakers on other surfaces (not shown). The speaker 132 may be configured to play back recorded audio or emit sounds associated with notifications.

A front surface of the image capture device 100 may include a drainage channel 134. A bottom surface of the image capture device 100 may include a (first) interconnect mechanism 136 for connecting the image capture device 100 to an accessory (FIGS. 4-8 below), handle grip, or other securing device. In the example shown in FIG. 1B, the interconnect mechanism 136 includes folding protrusions 137 (e.g., fingers 137A) that are configured to move between a nested or collapsed position as shown and an extended or open position (not shown) that facilitates coupling of the protrusions 137 to mating protrusions of other devices such as accessories, handle grips, mounts, clips, or like devices, as discussed in further detail below. More specifically, the interconnect mechanism 136 includes a (first) protrusion 137*i* defining a (first) opening 137Bi and a (second) protrusion 137*ii* defining a (second) opening 137Bii, which are moveable between the nested and extended positions independently of each other. As seen in FIG. 1B, for example, when the protrusions 137 are in the nested position, the protrusions 137 are received within (accommodated by) corresponding cavities 103, which extend (vertically upward) into the body 102 (e.g., towards the shutter button 112), and when the protrusions 137 are in the extended position, the protrusions 137 are removed from the cavities 103 such that the protrusions 137 extend (vertically downward) from the body (e.g., away from the shutter button 112). More specifically, the body 102 includes a (first) cavity 103i that is configured to receive the protrusion 137i when the protrusion 137i is in the nested position and a (second) cavity 103ii that is configured to receive the protrusion 137ii when the protrusion 137ii is in the nested position. To facilitate reception of the protrusions 137, the cavities 103 include identical (or generally identical) configurations, which correspond to those defined by the protrusions 137. As such, in the illustrated embodiment, the cavities 103 each include a D-shaped (or generally D-shaped) transverse (e.g., horizontal) cross-sectional configuration. It should be appreciated, however, that the particular configurations of the protrusions 137 and the cavities 103 may be altered in various embodiments without departing from the scope of the present disclosure.

The image capture device 100 may include an interactive display 138 that allows for interaction with the image capture device 100 while simultaneously displaying information on a surface of the image capture device 100.

The image capture device 100 of FIGS. 1A-B includes an exterior that encompasses and protects internal electronics. In the present example, the exterior includes six surfaces (i.e., a front face, a left face, a right face, a back face, a top face, and a bottom face) that form a rectangular cuboid. Furthermore, both the front and rear surfaces of the image capture device 100 are rectangular. In other embodiments, the exterior may have a different shape. The image capture device 100 may be made of a rigid material such as plastic, aluminum, steel, or fiberglass. The image capture device 100 may include features other than those described here. For example, the image capture device 100 may include additional buttons or different interface features, such as interchangeable lenses, cold shoes, and hot shoes that can add functional features to the image capture device 100.

The image capture device 100 may include various types of image sensors, such as charge-coupled device (CCD) sensors, active pixel sensors (APS), complementary metal-oxide-semiconductor (CMOS) sensors, N-type metal-oxide-semiconductor (NMOS) sensors, and/or any other image sensor or combination of image sensors.

Although not illustrated, in various embodiments, the image capture device 100 may include other additional electrical components (e.g., an image processor, camera system-on-chip (SoC), etc.), which may be included on one or more circuit boards within the body 102 of the image capture device 100.

The image capture device 100 may interface with or communicate with an external device, such as an external user interface device (not shown), via a wired or wireless computing communication link (e.g., the I/O interface 124). Any number of computing communication links may be used. The computing communication link may be a direct computing communication link or an indirect computing communication link, such as a link including another device or a network, such as the internet, may be used.

In some implementations, the computing communication link may be a Wi-Fi link, an infrared link, a Bluetooth (BT) link, a cellular link, a ZigBee link, a near field communications (NFC) link, such as an ISO/IEC 20643 protocol link, an Advanced Network Technology interoperability (ANT+) link, and/or any other wireless communications link or combination of links.

In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

The image capture device 100 may transmit images, such as panoramic images, or portions thereof, to the external user interface device via the computing communication link, and the external user interface device may store, process, display, or a combination thereof the panoramic images.

The external user interface device may be a computing device, such as a smartphone, a tablet computer, a phablet, a smart watch, a portable computer, personal computing device, and/or another device or combination of devices configured to receive user input, communicate information with the image capture device 100 via the computing communication link, or receive user input and communicate information with the image capture device 100 via the computing communication link.

The external user interface device may display, or otherwise present, content, such as images or video, acquired by the image capture device 100. For example, a display of the external user interface device may be a viewport into the three-dimensional space represented by the panoramic images or video captured or created by the image capture device 100.

The external user interface device may communicate information, such as metadata, to the image capture device 100. For example, the external user interface device may send orientation information of the external user interface device with respect to a defined coordinate system to the image capture device 100, such that the image capture device 100 may determine an orientation of the external user interface device relative to the image capture device 100.

Based on the determined orientation, the image capture device 100 may identify a portion of the panoramic images or video captured by the image capture device 100 for the image capture device 100 to send to the external user interface device for presentation as the viewport. In some implementations, based on the determined orientation, the image capture device 100 may determine the location of the external user interface device and/or the dimensions for viewing of a portion of the panoramic images or video.

The external user interface device may implement or execute one or more applications to manage or control the image capture device 100. For example, the external user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the external user interface device, such as via an application, may remotely control the image capture device 100 such as in response to user input.

The external user interface device, such as via an application, may display unprocessed or minimally processed images or video captured by the image capture device 100 contemporaneously with capturing the images or video by the image capture device 100, such as for shot framing or live preview, and which may be performed in response to user input. In some implementations, the external user interface device, such as via an application, may mark one or more key moments contemporaneously with capturing the images or video by the image capture device 100, such as with a tag or highlight in response to a user input or user gesture.

The external user interface device, such as via an application, may display or otherwise present marks or tags associated with images or video, such as in response to user input. For example, marks may be presented in a camera roll application for location review and/or playback of video highlights.

The external user interface device, such as via an application, may wirelessly control camera software, hardware, or both. For example, the external user interface device may include a web-based graphical interface accessible by a user for selecting a live or previously recorded video stream from the image capture device 100 for display on the external user interface device.

The external user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

Figure 2A:
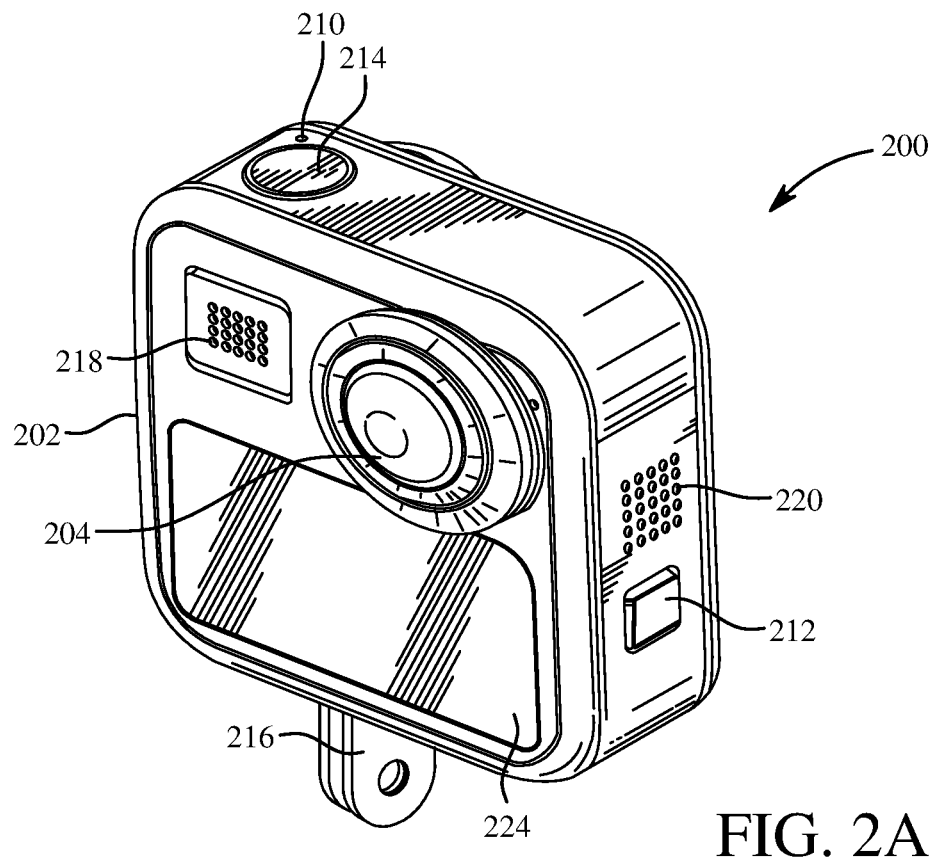
FIGS. 2A-B are isometric views of another example of an image capture device.
Figure 2B:
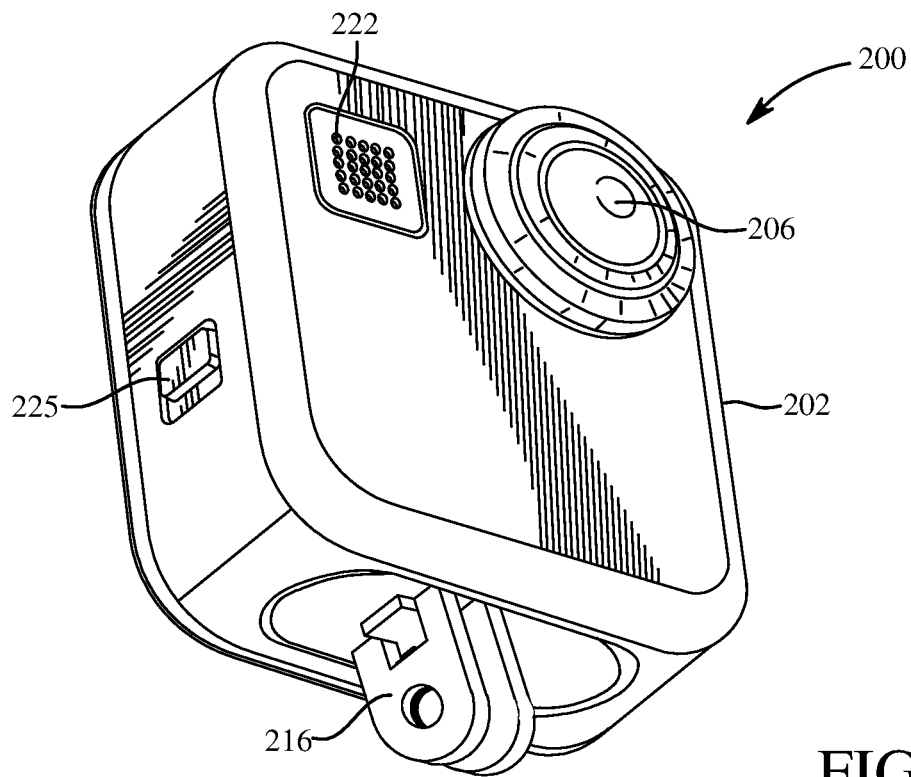

FIG. 2A and FIG. 2B illustrate another example of an image capture device 200. The image capture device 200 includes a body 202 and two camera lenses 204 and 206 disposed on opposing surfaces of the body 202, for example, in a back-to-back configuration, Janus configuration, or offset Janus configuration. The body 202 of the image capture device 200 may be made of a rigid material such as plastic, aluminum, steel, or fiberglass.

The image capture device 200 includes various indicators on the front of the surface of the body 202 (such as LEDs, displays, and the like), various input mechanisms (such as buttons, switches, and touch-screen mechanisms), and electronics (e.g., imaging electronics, power electronics, etc.) internal to the body 202 that are configured to support image capture via the two camera lenses 204 and 206 and/or perform other imaging functions.

The image capture device 200 includes various indicators, for example, LEDs 208, 210 to indicate a status of the image capture device 100. The image capture device 200 may include a mode button 212 and a shutter button 214 configured to allow a user of the image capture device 200 to interact with the image capture device 200, to turn the image capture device 200 on, and to otherwise configure the operating mode of the image capture device 200. It should be appreciated, however, that, in alternate embodiments, the image capture device 200 may include additional buttons or inputs to support and/or control additional functionality.

The image capture device 200 may include an interconnect mechanism 216 for connecting the image capture device 200 to a handle grip or other securing device. In the example shown in FIGS. 2A and 2B, the interconnect mechanism 216 includes folding protrusions configured to move between a nested or collapsed position (not shown) and an extended or open position as shown that facilitates coupling of the protrusions to mating protrusions of other devices such as handle grips, mounts, clips, or like devices.

The image capture device 200 may include audio components 218, 220, 222 such as microphones configured to receive and record audio signals (e.g., voice or other audio commands) in conjunction with recording video. The audio component 218, 220, 222 can also be configured to play back audio signals or provide notifications or alerts, for example, using speakers. Placement of the audio components 218, 220, 222 may be on one or more of several surfaces of the image capture device 200. In the example of FIGS. 2A and 2B, the image capture device 200 includes three audio components 218, 220, 222, with the audio component 218 on a front surface, the audio component 220 on a side surface, and the audio component 222 on a back surface of the image capture device 200. Other numbers and configurations for the audio components are also possible.

The image capture device 200 may include an interactive display 224 that allows for interaction with the image capture device 200 while simultaneously displaying information on a surface of the image capture device 200. The interactive display 224 may include an I/O interface, receive touch inputs, display image information during video capture, and/or provide status information to a user. The status information provided by the interactive display 224 may include battery power level, memory card capacity, time elapsed for a recorded video, etc.

The image capture device 200 may include a release mechanism 225 that receives a user input to in order to change a position of a door (not shown) of the image capture device 200. The release mechanism 225 may be used to open the door (not shown) in order to access a battery, a battery receptacle, an I/O interface, a memory card interface, etc. (not shown) that are similar to components described in respect to the image capture device 100 of FIGS. 1A and 1B and FIGS. 2A and 2B.

In some embodiments, the image capture device 200 described herein includes features other than those described. For example, instead of the I/O interface and the interactive display 224, the image capture device 200 may include additional interfaces or different interface features. For example, the image capture device 200 may include additional buttons or different interface features, such as interchangeable lenses, cold shoes, and hot shoes that can add functional features to the image capture device 200.

Figure 3:
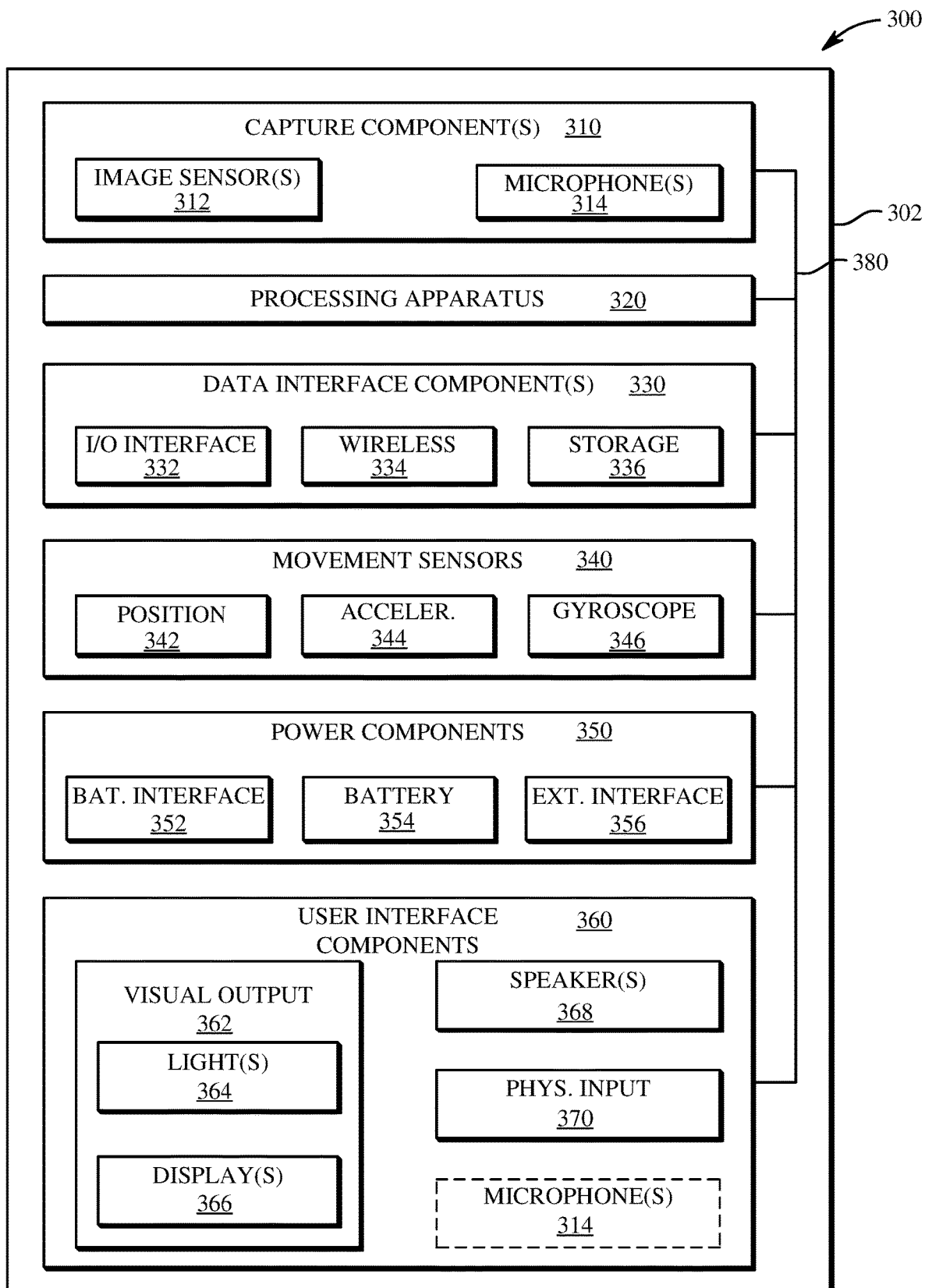
FIG. 3 is a block diagram of electronic components of an image capture device.

FIG. 3 is a block diagram of electronic components in an image capture device 300. The image capture device 300 may be a single-lens image capture device, a multi-lens image capture device, or variations thereof, including an image capture device with multiple capabilities such as use of interchangeable integrated sensor lens assemblies. The description of the image capture device 300 is also applicable to the image capture devices 100, 200 of FIGS. 1A-B and 2A-D.

The image capture device 300 includes a body 302 which includes electronic components such as capture components 310, a processing apparatus 320, data interface components 330, movement sensors 340, power components 350, and/or user interface components 360.

The capture components 310 include one or more image sensors 312 for capturing images and one or more microphones 314 for capturing audio.

The image sensor(s) 312 is configured to detect light of a certain spectrum (e.g., the visible spectrum or the infrared spectrum) and convey information constituting an image as electrical signals (e.g., analog or digital signals). The image sensor(s) 312 detects light incident through a lens coupled or connected to the body 302. The image sensor(s) 312 may be any suitable type of image sensor, such as a charge-coupled device (CCD) sensor, active pixel sensor (APS), complementary metal-oxide-semiconductor (CMOS) sensor, N-type metal-oxide-semiconductor (NMOS) sensor, and/or any other image sensor or combination of image sensors.

Image signals from the image sensor(s) 312 may be passed to other electronic components of the image capture device 300 via a bus 380, such as to the processing apparatus 320. In some implementations, the image sensor(s) 312 includes a digital-to-analog converter. A multi-lens variation of the image capture device 300 can include multiple image sensors 312.

The microphone(s) 314 is configured to detect sound, which may be recorded in conjunction with capturing images to form a video. The microphone(s) 314 may also detect sound in order to receive audible commands to control the image capture device 300.

The processing apparatus 320 may be configured to perform image signal processing (e.g., filtering, tone mapping, stitching, and/or encoding) to generate output images based on image data from the image sensor(s) 312. The processing apparatus 320 may include one or more processors having single or multiple processing cores. In some implementations, the processing apparatus 320 may include an application specific integrated circuit (ASIC). For example, the processing apparatus 320 may include a custom image signal processor. The processing apparatus 320 may exchange data (e.g., image data) with other components of the image capture device 300, such as the image sensor(s) 312, via the bus 380.

The processing apparatus 320 may include memory, such as a random-access memory (RAM) device, flash memory, or another suitable type of storage device, such as a non-transitory computer-readable memory. The memory of the processing apparatus 320 may include executable instructions and data that can be accessed by one or more processors of the processing apparatus 320. For example, the processing apparatus 320 may include one or more dynamic random-access memory (DRAM) modules, such as double data rate synchronous dynamic random-access memory (DDR SDRAM). In some implementations, the processing apparatus 320 may include a digital signal processor (DSP). More than one processing apparatus may also be present or associated with the image capture device 300.

The data interface components 330 enable communication between the image capture device 300 and other electronic devices, such as a remote control, a smartphone, a tablet computer, a laptop computer, a desktop computer, or a storage device. For example, the data interface components 330 may be used to receive commands to operate the image capture device 300, transfer image data to other electronic devices, and/or transfer other signals or information to and from the image capture device 300. The data interface components 330 may be configured for wired and/or wireless communication. For example, the data interface components 330 may include an I/O interface 332 that provides wired communication for the image capture device, which may be a USB interface (e.g., USB type-C), a high-definition multimedia interface (HDMI), or a FireWire interface. The data interface components 330 may include a wireless data interface 334 that provides wireless communication for the image capture device 300, such as a Bluetooth interface, a ZigBee interface, and/or a Wi-Fi interface. The data interface components 330 may include a storage interface 336, such as a memory card slot configured to receive and operatively couple to a storage device (e.g., a memory card) for data transfer with the image capture device 300 (e.g., for storing captured images and/or recorded audio and video).

The movement sensors 340 may detect the position and movement of the image capture device 300. The movement sensors 340 may include a position sensor 342, an accelerometer 344, or a gyroscope 346. The position sensor 342, such as a global positioning system (GPS) sensor, is used to determine a position of the image capture device 300. The accelerometer 344, such as a three-axis accelerometer, measures linear motion (e.g., linear acceleration) of the image capture device 300. The gyroscope 346, such as a three-axis gyroscope, measures rotational motion (e.g., rate of rotation) of the image capture device 300. Other types of movement sensors 340 may also be present or associated with the image capture device 300.

The power components 350 may receive, store, and/or provide power for operating the image capture device 300. The power components 350 may include a battery interface 352 and a battery 354. The battery interface 352 operatively couples to the battery 354, for example, with conductive contacts to transfer power from the battery 354 to the other electronic components of the image capture device 300. The power components 350 may also include an external interface 356, and the power components 350 may, via the external interface 356, receive power from an external source, such as a wall plug or external battery, for operating the image capture device 300 and/or charging the battery 354 of the image capture device 300. In some implementations, the external interface 356 may be the I/O interface 332. In such an implementation, the I/O interface 332 may enable the power components 350 to receive power from an external source over a wired data interface component (e.g., a USB type-C cable).

The user interface components 360 may allow the user to interact with the image capture device 300, for example, providing outputs to the user and receiving inputs from the user. The user interface components 360 may include visual output components 362 to visually communicate information and/or present captured images to the user. The visual output components 362 may include one or more lights 364 and/or more displays 366. The display(s) 366 may be configured as a touch screen that receives inputs from the user. The user interface components 360 may also include one or more speakers 368. The speaker(s) 368 can function as an audio output component that audibly communicates information and/or presents recorded audio to the user. The user interface components 360 may also include one or more physical input interfaces 370 that are physically manipulated by the user to provide input to the image capture device 300. The physical input interfaces 370 may, for example, be configured as buttons, toggles, or switches. The user interface components 360 may also be considered to include the microphone(s) 314, as indicated in dotted line, and the microphone(s) 314 may function to receive audio inputs from the user, such as voice commands.

Figure 4:
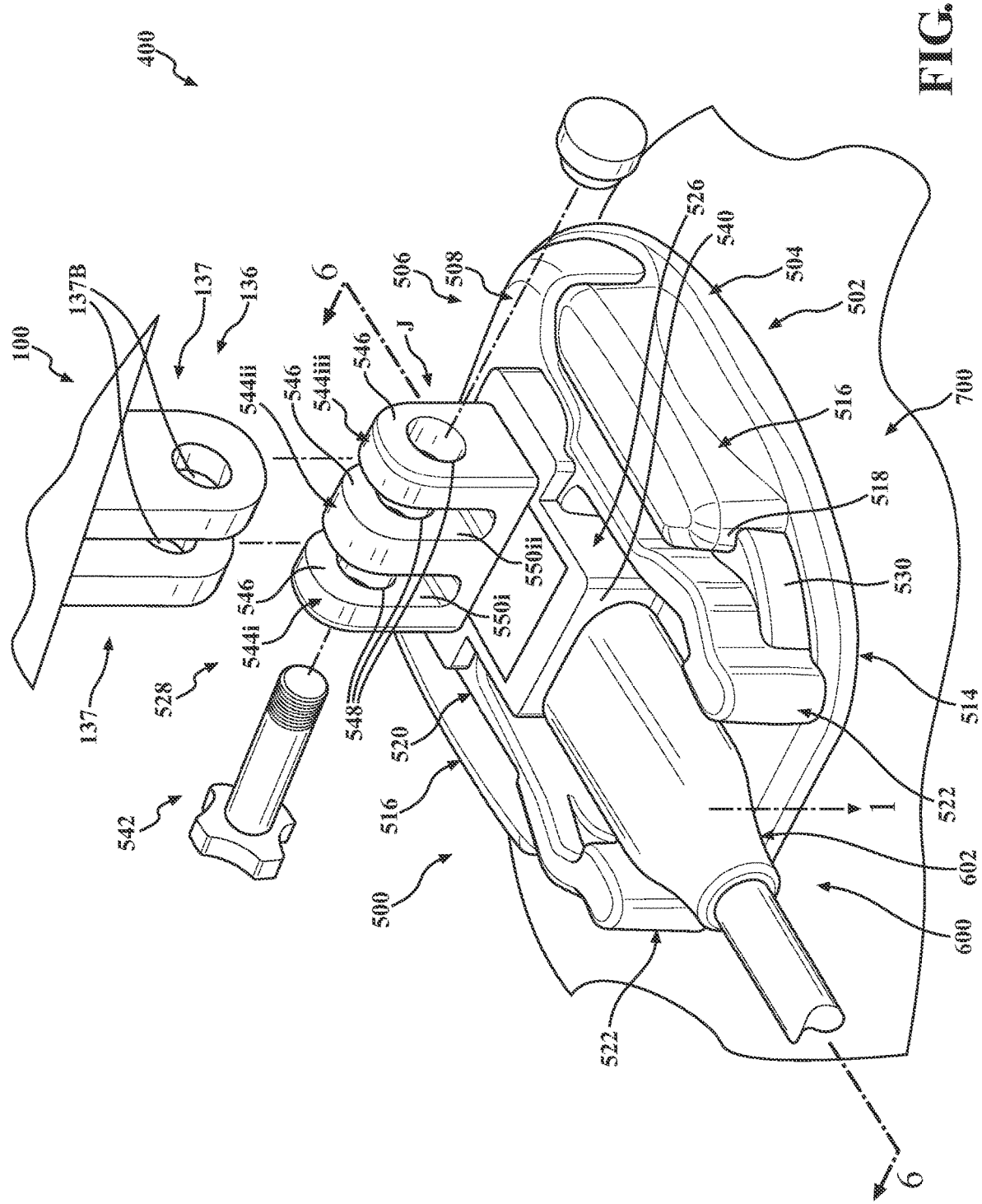
FIG. 4 is a top, perspective view of an accessory mounting system that includes: the image capture device seen in FIGS. 1A-B; a mount according to the present disclosure; and a power cord.
Figure 5:
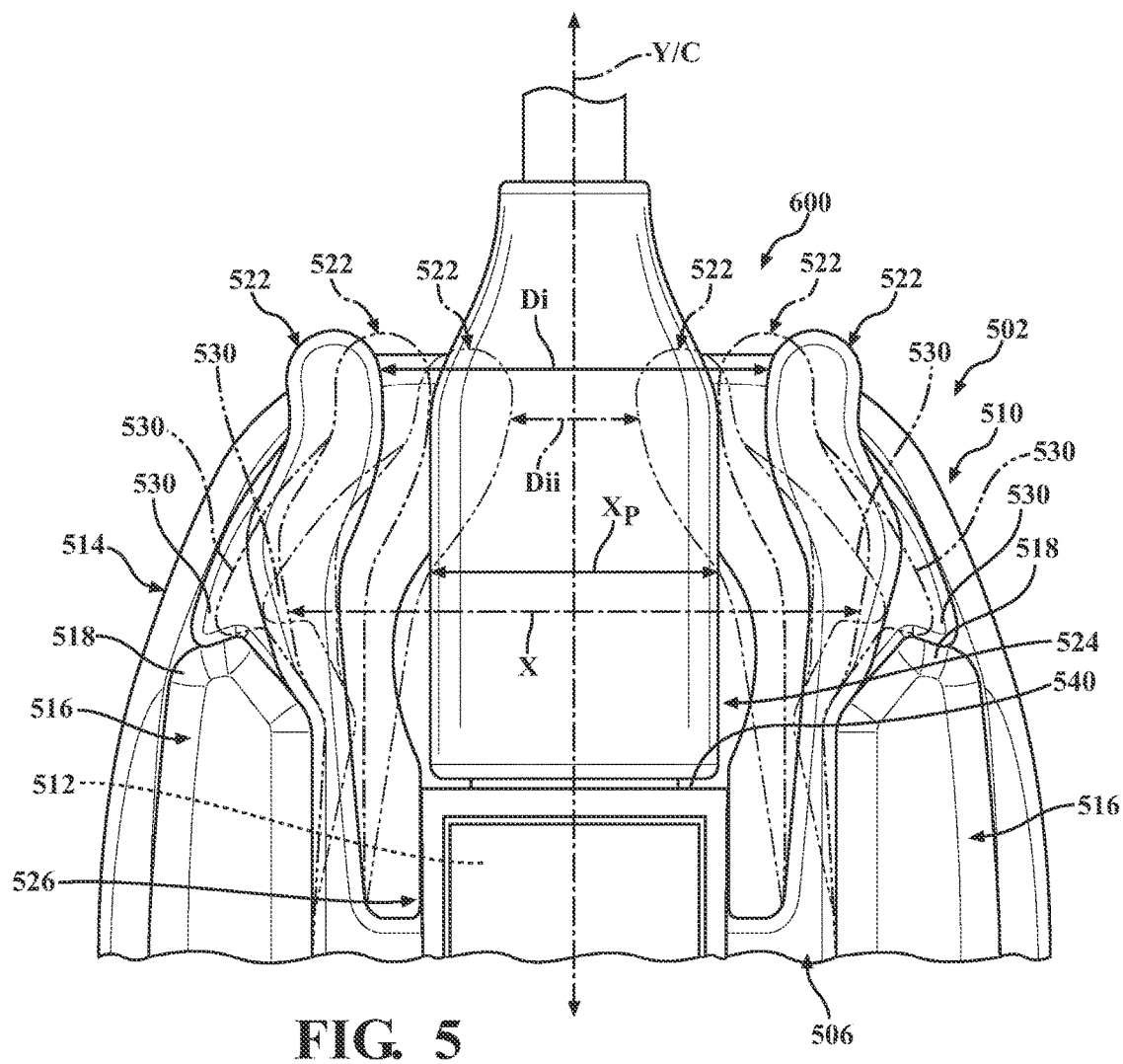
FIG. 5 is a partial, top, plan view of the mount and the power cord illustrating repositioning of the mount between an engaged position and a disengaged position (shown in phantom).
Figure 6:
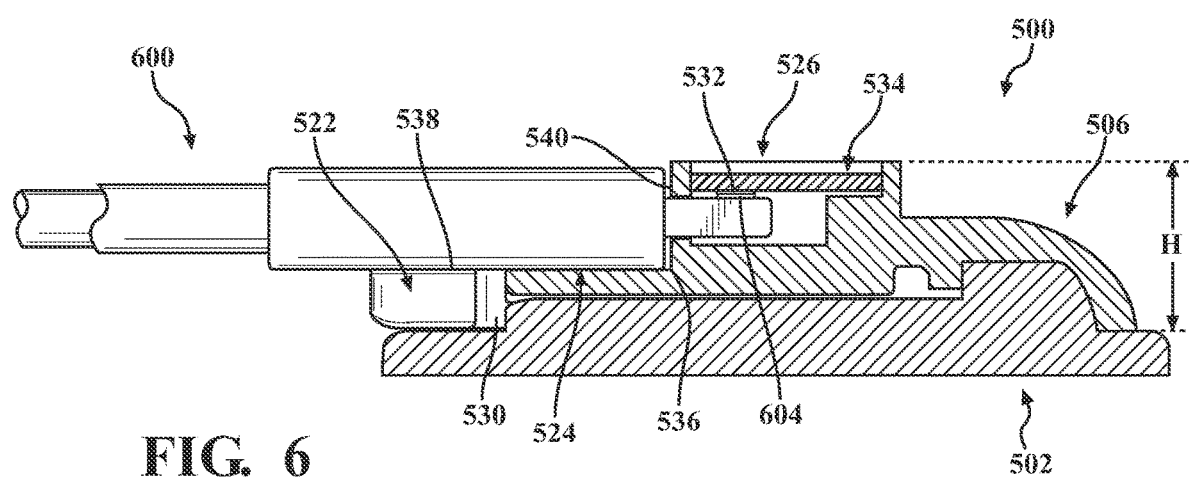
FIG. 6 is a partial, (vertical) cross-sectional view taken along line 6-6 in FIG. 4.

Referring now to FIGS. 4-6, an accessory mounting system 400 will be discussed, which includes: the image capture device 100; a mount (coupler) 500; and a power cord 600. More specifically, FIG. 4 provides a top, perspective view of the accessory mounting system 400; FIG. 5 provides a partial, top, plan view of the mount 500 and the power cord 600 illustrating repositioning of the mount 500 between an engaged position and a disengaged position (shown in phantom); and FIG. 6 provides a partial, (vertical) cross-sectional view of the mount 500 and the power cord 600 taken along line 6-6 in FIG. 4.

The mount 500 is configured to releasably connect the image capture device 100 to an accessory (product) 700 (e.g., a vest, a glove, a helmet, a hat, a tripod, a hand-held apparatus, a power supply, a vehicle, a bicycle, a surfboard, etc.) and, thus, provides an interface between the image capture device 100 and the accessory 700. As described in detail below, the mount 500 facilitates repeated connection and disconnection of the image capture device 100 and the accessory 700, and allows for articulation of the image capture device 100 in relation to the mount 500 and, thus, the accessory 700, about an articulation joint J.

In the illustrated embodiment, the mount 500 includes a female component 502 (e.g., a female buckle 504), and a male component 506 (e.g., a male buckle 508). The female component 502 is configured for connection to (e.g., releasable engagement with), or is otherwise supported by, the accessory 700, and the male component 506 is configured for removable insertion into the female component 502 such that the female component 502 and the male component 506 are releasably engageable.

Although generally discussed in connection with the image capture device 100 herein below, it should be appreciated that the mount 500 may be configured for use with any image capture device, such as the various embodiments described herein above (e.g., the aforedescribed image capture devices 200, 300). It is also envisioned that the mount 500 may be utilized in connection with a housing (e.g., a dive housing) for any of the image capture devices 100, 200, 300, etc., described herein, or any other ancillary component or system used to support, enclose, or otherwise accommodate any of the aforedescribed image capture devices 100, 200, 300, etc. As such, throughout the following disclosure, the term "image capture device" should be understood as referring to either the image capture device 100, 200, 300, etc., itself, to a housing for any of the image capture devices 100, 200, 300, etc., or to any other such ancillary component or system.

It is envisioned that the mount 500 may be configured for use with (e.g., for connection to) any suitable accessory (product), including the image capture device 100, a light source, etc. As such, embodiments of the present disclosure in which the image capture device 100 may be replaced by (and in which the accessory mounting system 400 may include) an alternate accessory (product) are also envisioned herein, and would not be beyond the scope of the present disclosure.

The mount 500 (e.g., the female component 502 and the male component 506) may include (e.g., may be formed from) any suitable material or combination of materials, whether metallic (e.g., aluminum, steel, etc.) or non-metallic (e.g., polymeric, plastic, composite, etc.). As such, embodiments are envisioned in which the female and male components 502, 506 of the mount 500 may include (e.g., may be formed from) identical materials, as are embodiments in which the female and male components 502, 506 of the mount 500 may include (e.g., may be formed from) a variety of (non-identical) materials. For example, it is envisioned that certain components of the mount 500 that may be subject to increased wear may include a metallic material whereas other components of the mount 500 may include non-metallic materials.

The female component 502 includes a body 510 (FIG. 5) defining a passageway 512 that is configured to receive the male component 506 such that the male component 506 is slidably insertable into the female component 502 along a (first) longitudinal axis Y (e.g., an assembly/disassembly axis). The body 510 includes a base 514, which (slidably) supports the male component 506, and upstanding (vertical) walls 516, which collectively define the passageway 512. As described in further detail below, the upstanding walls 516 define stops 518 (FIG. 5) that are configured for engagement (contact) with the male component 506.

It is envisioned that the mount 500 and the accessory 700 may be connected in any suitable manner. For example, it is envisioned that the mount 500 (e.g., the body 510 of the female component 502) and the accessory 700 may be configured as discrete components that are connected (connectable) via one or more mechanical fasteners (e.g., one or more pins, set screws, clips, etc.), via an adhesive, or the like. Alternatively, it is envisioned that the mount 500 (e.g., the body 510) and the accessory 700 may be integrally (e.g., monolithically, unitarily) formed.

The male component 506 includes: a body 520, which is configured for (slidable) insertion into the passageway 512 defined by the body 510 of the female component 502; a pair of (deflectable) arms 522 that are supported by (extend from) the body 520; a support 524 (FIG. 5) that is supported by (extends from) the body 520; an integrated power hub 526 that is supported by (extends from) the body 520 and which is configured to (removably) receive the power cord 600 (e.g., a USB cable 602, a USB-C cable, etc.) such that the mount 500 provides an electrical interface between the power cord 600 and the image capture device 100; and a (second) interconnect mechanism 528 that is supported by (extends from) the body 520 and which is configured to interface with the (first) interconnect mechanism 136 (FIGS. 1B, 4) on the image capture device 100 to facilitate removable connection of the image capture device 100 and the mount 500. As described in detail below, upon connection of the power cord 600 to the power hub 526, together with the stops 518 (on the female component 502), the arms 522, the power hub 526, and the power cord 600 provide an anti-disconnection feature that inhibits (if not entirely prevents) disconnection of the respective female and male components 502, 506 and, thus, disassembly of the mount 500.

The arms 522 include locking members 530, which are configured for engagement (contact) with the stops 518 on the female component 502 and are positioned laterally outward of the power hub 526 along an axis X (FIG. 5) that extends in transverse (e.g., generally orthogonal, horizontal) relation to the longitudinal axis Y. The arms 522 are supported by, and extend from, the body 520 and include (e.g., are formed partially or entirely from) a flexible material, which allows for resilient repositioning (deflection) of the mount 500 and the arms 522 between an engaged (normal, locked) position, which is shown in FIG. 4 (and in solid lines in FIG. 5), and a disengaged (deflected, unlocked) position, which is shown in phantom in FIG. 5. In the engaged position, the arms 522 define a (first) lateral (transverse, horizontal) distance Di therebetween and the locking members 530 are positioned in general alignment and engagement (contact) with the stops 518, whereby the arms 522 releasably connect (secure, lock together) the male component 506 and the female component 502 so as to inhibit (if not entirely prevent) removal of the male component 506 from the female component 502. In the disengaged position, the arms 522 defined a reduced (second) lateral (transverse, horizontal) distance Dii therebetween and are positioned out of alignment with, and are disengaged from, the stops 518, which allows for disengagement and removal (disconnection) of the male component 506 from the female component 502, as described in further detail below. In order to transition the mount 500 from the engaged position into the disengaged position, the arms 522 must be deflected beyond a threshold release distance, which is dictated by the configuration of the locking members 530 and the stops 518. For example, in the embodiment illustrated, the male component 506 is configured such that the threshold release distance is (approximately) 6 mm (e.g., within the range of (approximately) 5 mm to (approximately) 7 mm). Stated differently, in the embodiment illustrated, the male component 506 is disconnectable and removable from the female component 502 upon deflecting the arms 522 such that the lateral distance Dii therebetween is (approximately) 6 mm (or less). Embodiments in which the threshold release distance may lie outside the disclosed range are also envisioned herein, however, and would not be beyond the scope of the present disclosure.

The support 524 (FIG. 5) is connected to the body 520 and is positioned between the arms 522. In the embodiment illustrated, the support 524 is integrally (e.g., monolithically, unitarily) formed with the body 520 (e.g., via insert molding). Embodiments are also envisioned, however, in which the body 520 and the support 524 may be formed as separate components that are fixedly secured together via mechanical engagement (e.g., one or more pins, set screws, clips, or other such fasteners), via an adhesive, etc.

The support 524 guides the male component 506 during insertion into the passageway 512 in the female component 502 and is configured to inhibit (if not entirely prevent) overtravel of the arms 522 during deflection via engagement (contact) therewith (in the absence of the power cord 600) to reduce stresses in the material(s) of construction. More specifically, the arms 522 include (define) recesses, indentations, depressions, or the like that are configured to receive (accommodate) the support 524.

The support 524 is positioned between the arms 522 and vertically beneath the power cord 600 (upon connection to the power hub 526). The support 524 thus vertically braces the power cord 600 to inhibit (if not entirely prevent) damage to the power cord 600 and/or the male component 506 (e.g., the power hub 526) upon the application of force in the vertically downward direction identified by arrow 1 in FIG. 4.

The power hub 526 is configured to receive the power cord 600 via advancement along a (second) longitudinal axis C (e.g., a connection/disconnection axis) that extends in generally parallel relation to the longitudinal axis Y (and in transverse (e.g., generally orthogonal) relation to the axis X). The power hub 526 includes a series of internal electrical components that support the communication of power, data, etc., to and/or from the mount 500, including, for example, a (first) electrical contact 532 (FIG. 6) that is configured for engagement (contact) with a (second) electrical contact 604 on the power cord 600, a printed circuit board (PCB) 534 that supports the electrical contact 532, a microprocessor, etc. As seen in FIGS. 4 and 5, the power hub 526 is positioned between the arms 522, which facilitates engagement (contact) between the arms 522 and the power cord 600 during (inward) deflection of the arms 522 (e.g., movement of the arms 522 towards each other) and repositioning of the mount 500 from the engaged position (FIG. 4) towards the disengaged position (FIG. 5), as described in further detail below. More specifically, the power hub 526 is configured such that a lower (vertical) end 536 (FIG. 6) thereof is generally aligned with uppermost (vertical) surfaces 538 (FIG. 6) of the arms 522, which reduces an overall (vertical) height H of the male component 506 and the form factor of the mount 500, and such that an (axial) end wall 540 of the power hub 526 is spaced inwardly from the locking members 530 along the longitudinal axes C, Y (e.g., closer to the interconnect mechanism 528). The power hub 526 is also positioned in general alignment with the support 524 and is spaced (axially) therefrom along the longitudinal axis Y, as seen in FIG. 5, which facilities bracing of the power cord 600 by the support 524 in the manner discussed above.

While the power hub 526 is illustrated as being formed integrally (e.g., monolithically, unitarily) with the support 524 in the embodiment illustrated, embodiments are also envisioned in which the power hub 526 and the support 524 may be formed as separate components that are fixedly secured together via mechanical engagement (e.g., one or more pins, set screws, clips, or other such fasteners), via an adhesive, etc.

As indicated above, it is envisioned that the power cord 600 may be connected to any (external) source of power suitable for the intended purpose of delivering power to the mount 500 (via the power hub 526). For example, it is envisioned that the power cord 600 may be connected to a (portable) battery pack, to an accessory that includes an integrated power supply, to a USB port in a vehicle, a laptop (or other such portable electronic device), etc.

The interconnect mechanism 528 facilitates connection of the mount 500 to the image capture device 100 and is configured for releasable engagement with (coupling to) the (first) interconnect mechanism 136 (FIGS. 1B, 4) via an adjustable fastener 542. Although shown as being positioned generally adjacent to (e.g., as being connected to or otherwise supported by) the power hub 526 in the embodiment illustrated, it should be appreciated that the specific location of the interconnect mechanism 528 may be altered in various embodiments without departing from the scope of the present disclosure (e.g., depending upon the particular configuration of the accessory 700, the particular configuration image capture device 100, etc.).

As seen in FIG. 4, the interconnect mechanism 528 includes (a set, series, plurality of) protrusions 544 (e.g., fingers 546) that extend from the male component 506 and interface with (engage, connect to) the protrusions 137 (FIGS. 1B, 4) on the image capture device 100 so as to define the articulation joint J. The protrusions 544 each include an opening 548 and define channels 550 therebetween that are configured to receive the protrusions 137 such that the protrusions 137 are received by (positioned within, inserted into) the channels 550, which facilitates proper alignment (registration) of the openings 137B, 548 respectively defined by the protrusions 137, 544 during connection of the image capture device 100 and the mount 500. While the interconnect mechanism 528 is shown as including three protrusions 544i, 544ii, 544iii and two channels 550i, 550ii in the embodiment illustrated, it should be appreciated that the particular numbers of protrusions 544 and channels 550 may be varied in alternate embodiments without departing from the scope of the present disclosure (e.g., depending on the number of protrusions 137 included on the image capture device 100).

Figure 7:
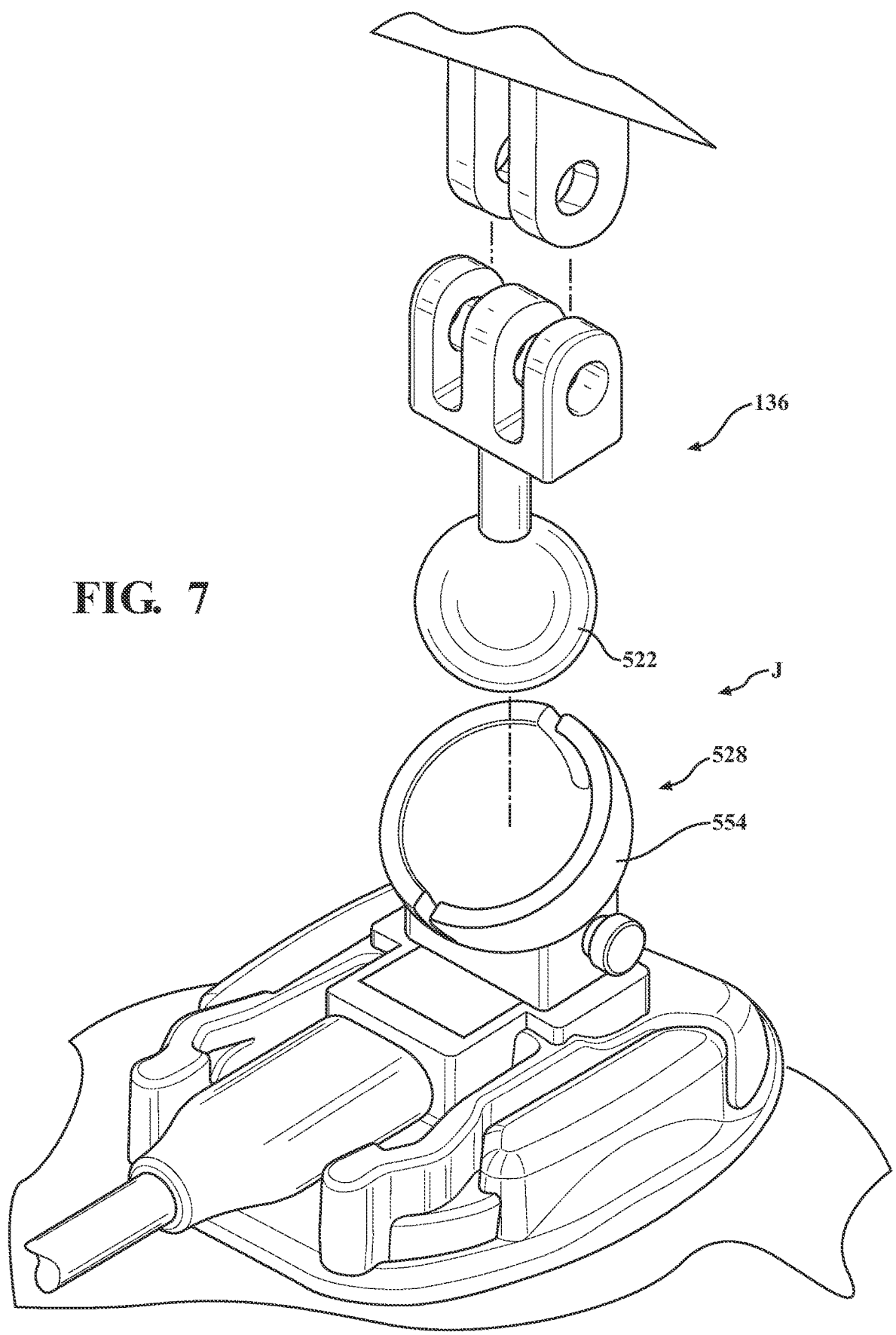
FIG. 7 is a top, perspective view of the accessory mounting system according to an alternate embodiment of the present disclosure.

While the interconnect mechanisms 136, 528 have been respectively shown as including corresponding protrusions 137, 544 in the embodiment illustrated, it should be appreciated that the particular configurations of the interconnect mechanisms 136, 528 may be varied in alternate embodiments without departing from the scope of the present disclosure. For example, as seen in FIG. 7, in an alternate embodiment of the present disclosure, it is envisioned that the interconnect mechanism 136 may instead include a ball linkage 552 that is configured for reception within a corresponding socket 554 on the interconnect mechanism 528, or vice versa (e.g., such that that interconnect mechanism 528 includes the ball linkage 552 and the interconnect mechanism 136 includes the socket 554). The ball linkage 552 and the socket 554 allow for an increase in the range of motion for the image capture device 100 about the articulation joint J such that the image capture device 100 is movable in relation to the mount 500 and, thus, the accessory 700, in additional degrees of freedom.

With continued reference to FIGS. 4-6, use of the accessory mounting system 400 will be discussed. Initially, the male component 506 is inserted into the passageway 512 (FIG. 5) in the female component 502 to thereby assemble the mount 500. More specifically, the male component 506 is slidably advanced along the longitudinal axis Y into the position illustrated in FIG. 4, whereby the locking members 530 engage (contact) the stops 518 so as to (releasably) connect the male component 506 and the female component 502.

Either prior or subsequent to connection of the respective male and female components 502, 506, the image capture device 100 and the mount 500 are connected (secured) together via engagement of the interconnect mechanisms 136, 528, during which, the protrusions 137 (FIG. 4) are inserted into the channels 550. The adjustable fastener 542 can then be inserted through the interconnect mechanisms 136, 528 so as to define the articulation joint J and tightened to thereby connect (secure) the image capture device 100 and the mount 500 and fix the position of the image capture device 100 in relation to the mount 500 and the accessory 700 (e.g., the tilt angle of the image capture device 100).

Either prior or subsequent to connection of the image capture device 100 and the mount 500, the power cord 600 is connected to the power hub 526 so as to cause engagement of the electrical contacts 532, 604 (FIG. 6) and thereby electrically connect the power cord 600 to the mount 500. As seen in FIG. 5, the power cord 600 defines a (maximum) transverse (lateral, horizontal) cross-sectional dimension Xp, which exceeds the threshold release distance. As such, when the power cord 600 is connected to the power hub 526, inward (lateral) movement of the arms 522 results in engagement (contact) with the power cord 600, which inhibits (if not entirely prevents) the deflection required to realize the disengaged position. Together with the stops 518, the arms 522, the power hub 526, and the power cord 600 thus collectively provide the aforementioned anti-disconnection feature, which inhibits (if not entirely prevents) disconnection of the respective female and male components 502, 506 to thereby maintain (preserve) assembly of the mount 500 until such time that the power cord 600 is removed from the power hub 526.

In the embodiment illustrated, the power cord 600 is configured such that the transverse cross-sectional dimension Xp lies substantially within the range of (approximately) 6 mm to (approximately) 13 mm. Embodiments in which the transverse cross-sectional dimension Xp may lie outside the disclosed range are also envisioned herein, however, and would not be beyond the scope of the present disclosure.

Depending upon the particular configuration of the power cord 600 (e.g., the specific transverse cross-sectional dimension Xp), it is envisioned that the configuration of the mount 500 (e.g., the arms 522) may be varied so as to achieve any necessary or suitable threshold release distance and support operation (functionality) of the mount 500 in the manner described herein. For example, in an embodiment in which the transverse cross-sectional dimension Xp may be (approximately) 4 mm, it is envisioned that the arms 522 may be reconfigured to reduce the threshold release distance accordingly.

Following use of the accessory mounting system 400, the power cord 600 can be removed from the power hub 526, which allows for repositioning of the mount 500 from the engaged position into the disengaged position via the application of inwardly-directed forces to the arms 522, which approximates the arms 522 (e.g., moves the arms 522 towards each other). Upon sufficient inward movement of the arms 522 (e.g., upon deflection of the arms 522 beyond the threshold release distance), which is permitted in the absence of the power cord 600, the locking members 530 disengage (separate from) the stops 518, which allows for disassembly of the mount 500 by slidably removing the male component 506 from the female component 502 (e.g., from the passageway 512).

Either prior or subsequent to disassembly of the mount 500, the image capture device 100 can be separated from the mount 500 (e.g., the male component 506) via loosening and removal of the adjustable fastener 542 from the interconnect mechanisms 136, 528.

Figure 8:
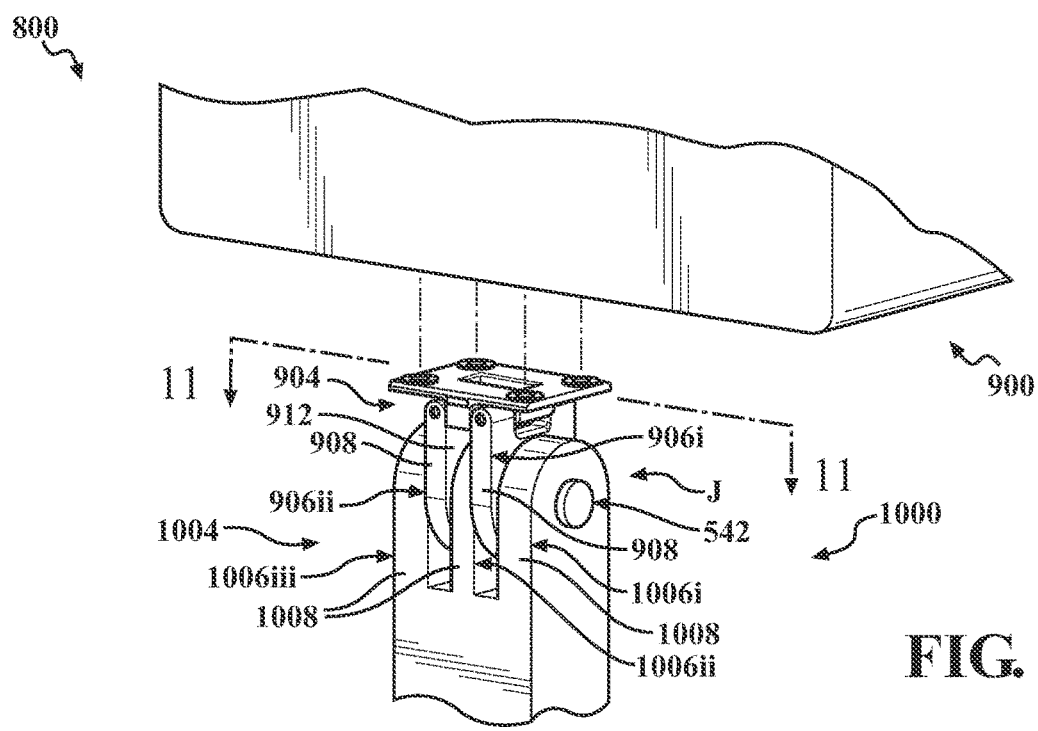
FIG. 8 is a partial, front, perspective view of another embodiment of the accessory mounting system, which includes alternate embodiments of the image capture device and the mount.
Figure 9:
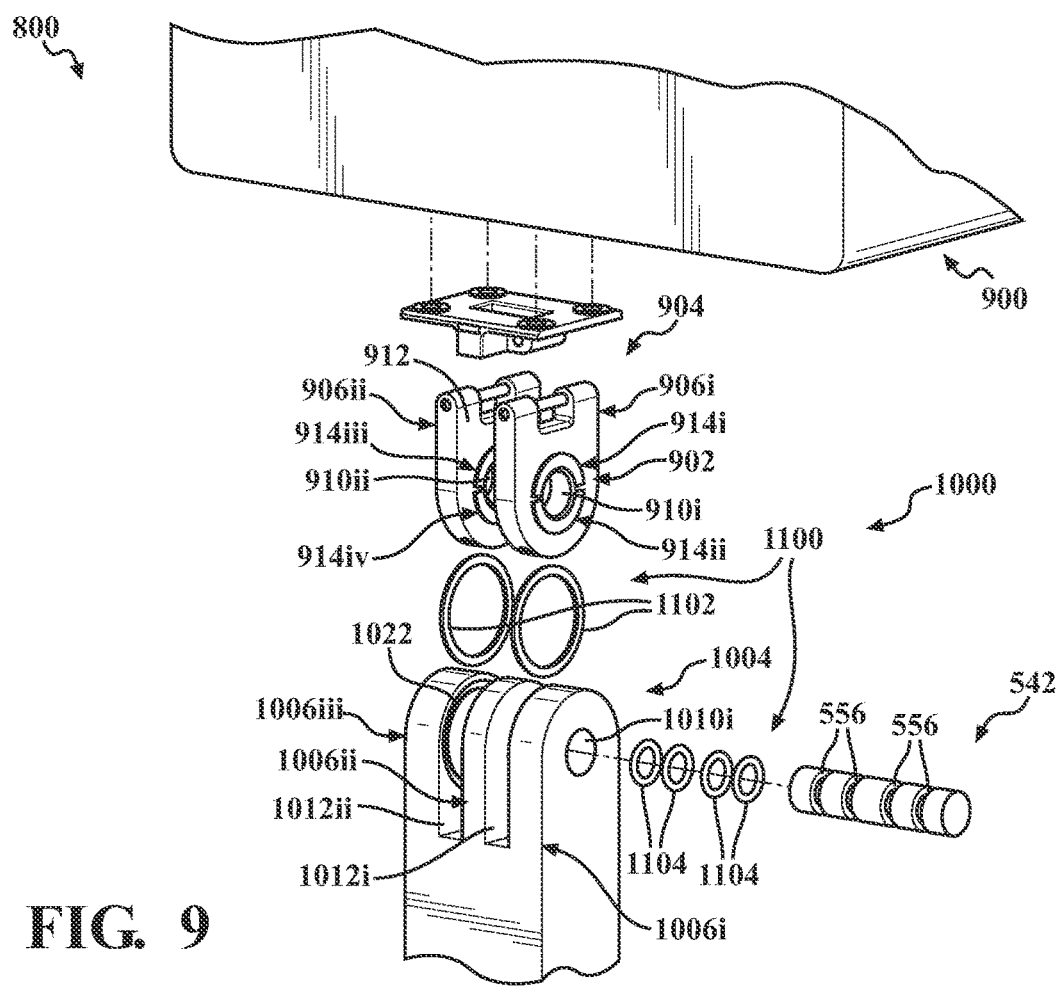
FIG. 9 is a partial, front, perspective view of the accessory mounting system seen in FIG. 8 with parts separated.
Figure 10:
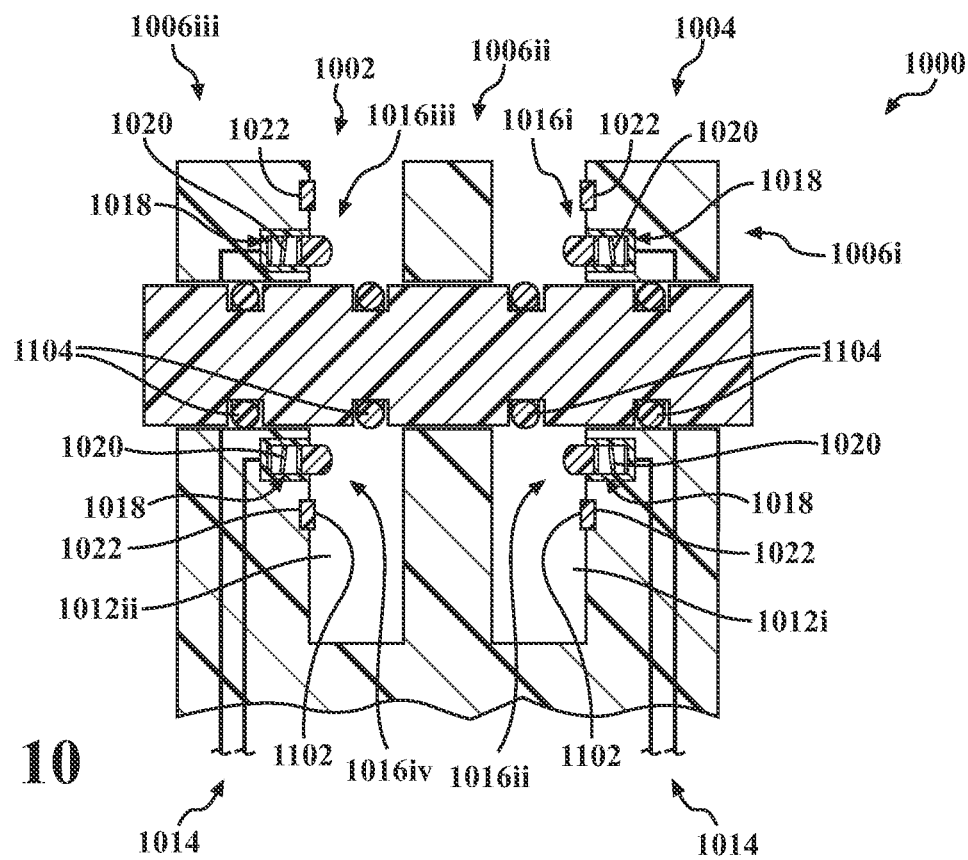
FIG. 10 is a partial, longitudinal (vertical), cross-sectional view of the mount seen in FIG. 8.
Figure 11:
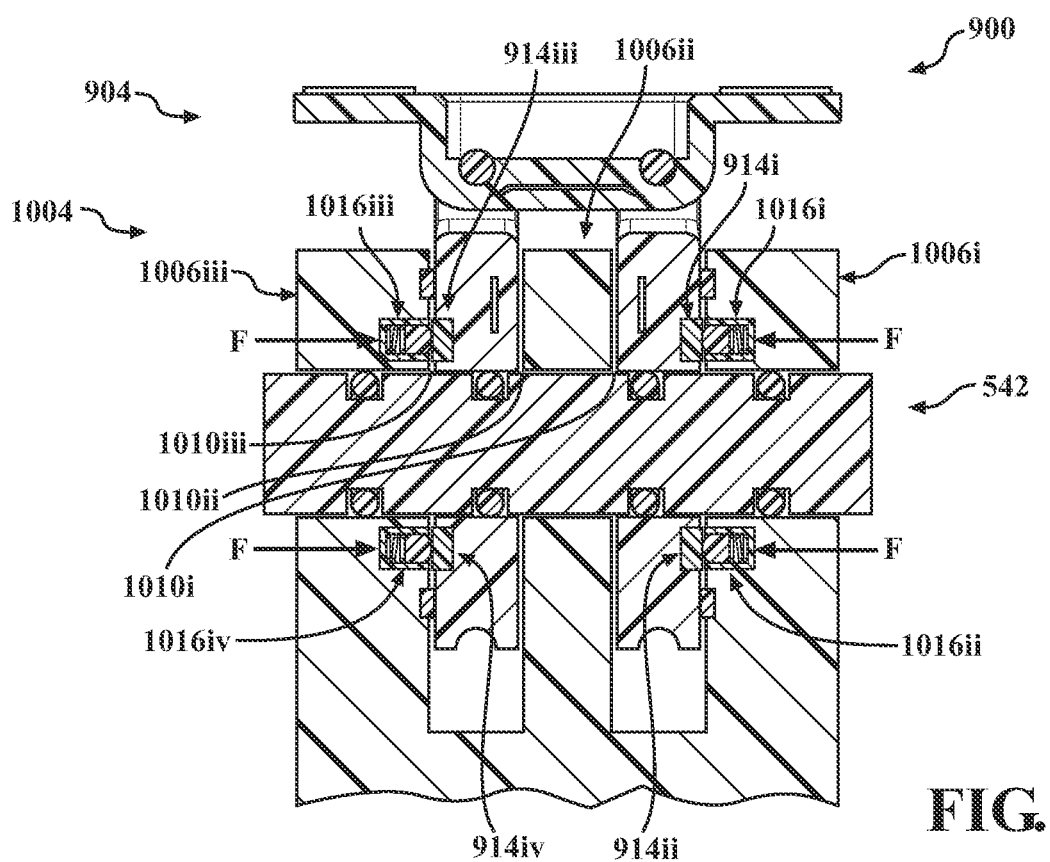
FIG. 11 is a partial, longitudinal (vertical), cross-sectional view of the accessory mounting system taken along line 11-11 in FIG. 8.

With reference now to FIGS. 8-11, an accessory mounting system 800 will be discussed, which is an alternate embodiment of the accessory mounting system 400. The accessory mounting system 800 includes an image capture device 900 and a mount 1000, which are alternate embodiments of the image capture device 100 and the mount 500, respectively. More specifically, FIG. 8 is a partial, front, perspective view of the accessory mounting system 800 with the image capture device 900 and the mount 1000 shown separated; FIG. 9 is a partial, front, perspective view of the accessory mounting system 800 with parts separated; FIG. 10 is a partial, longitudinal (vertical), cross-sectional view of the mount 1000; and FIG. 11 is a partial, longitudinal (vertical), cross-sectional view of the accessory mounting system 800 taken along line 11-11 in FIG. 8.

As described in detail below, the accessory mounting system 800 provides a durable, waterproof interface between the image capture device 900 and the mount 1000, which include corresponding (first and second) electrical interfaces 902 (FIG. 9), 1002 (FIG. 10), respectively, that are configured for direct contact in order to facilitate the communication of power and/or data to and/or from the image capture device 900 upon connection of the image capture device 900 and the mount 1000.

The image capture device 900 and the mount 1000 include components and features that are similar to the image capture device 100 and the mount 500 (FIGS. 4-6) discussed above and, accordingly, will only be discussed with respect to differences therefrom in the interest of brevity. As such, identical reference characters will be utilized to refer to elements, structures, features, etc., common to the image capture devices 100, 900 and the mounts 500, 1000.

The image capture device 900 includes a (first) interconnect mechanism 904, which is configured to facilitate releasable connection of the image capture device 900 and the mount 1000, and the electrical interface 902, which is supported by (secured, connected to) the interconnect mechanism 904.

The interconnect mechanism 904 includes components and features that are similar to the interconnect mechanism 136 (FIGS. 1B, 4) discussed above and, accordingly, will only be discussed with respect to differences therefrom in the interest of brevity. As such, identical reference characters will be utilized to refer to elements, structures, features, etc., common to the interconnect mechanisms 136, 904.

The interconnect mechanism 904 includes (a set, series, plurality of) protrusions 906 (e.g., fingers 908) that are reconfigurable between nested and extended positions. More specifically, the interconnect mechanism 904 includes a (first) protrusion 906*i* defining a (first) opening 910*i* (FIG. 9), and a (second) protrusion 906*ii* defining a (second)

opening 910ii, which are moveable between the nested and extended positions independently of each other. The protrusions 906i, 906ii define a channel 912 therebetween that is configured to receive the mount 1000, which facilitates proper alignment (registration) of the image capture device 900 and the mount 1000, as described in further detail below.

While the interconnect mechanism 904 is shown as including two protrusions 906 and a single channel 912 in the illustrated embodiment, it should be appreciated that the particular numbers of protrusions 906 and channels 912 may be varied in alternate embodiments without departing from the scope of the present disclosure (e.g., depending on the configuration of the mount 1000).

The electrical interface 902 facilitates the communication of power and/or data to and/or from the image capture device 900, and defines a first leg of a power and/or data path between the image capture device 900 and the mount 1000. For example, it is envisioned that the electrical interface 902 may be in electrical communication with the battery in the image capture device 900 to facilitate charging thereof, with one or more processors, logic boards, or other such electrical components in the image capture device 900, etc. In order to support such electrical communication, it is envisioned that the image capture device 900 may include one or more transmission members (not shown) (e.g., conduits, wires, flexible printed circuits, etc.) that extend between the electrical interface 902 and the battery, the processor(s), etc.

The electrical interface 902 includes (a set, series, plurality of) contact pads (surfaces) 914, which are supported by (secured, connected to) the protrusions 906, and include a static (e.g., fixed) configuration. More specifically, the electrical interface 902 include a (first) pair of contact pads 914i, 914ii that are supported by the protrusion 906i, and a (second) pair of contact pads 914iii, 914iv that are supported by the protrusion 906ii.

In the illustrated embodiment, the contact pads 914 are each generally C-shaped in configuration and include (e.g., are formed partially or entirely from) copper. It is envisioned, however, that the particular configuration of the contact pads 914 may be altered in various embodiments, and that the contact pads 914 may include any suitable electrically conductive material or combination of materials. For example, it is envisioned that the contact pads 914i, 914ii and the contact pads 914iii, 914iv may be configured as generally annular rings that are arranged concentrically (e.g., such that the contact pads 914i, 914iii circumscribe the contact pads 914ii, 914iv, respectively).

Although shown as including four contact pads 914 in the illustrated embodiment, it should be appreciated that the particular number of contact pads 914 may be increased or decreased in alternate embodiments in order to vary functionality by increasing or decreasing the communication of power and/or data to and/or from the image capture device 900. Additionally, while the contact pads 914 are shown as being embedded within (recessed into) the protrusions 916, embodiments are also envisioned in which the contact pads 914 may be surface mounted thereto such as, for example, via one or more mechanical fasteners (e.g., one or more pins, set screws, clips, etc.), via an adhesive, via overmolding, etc.

The mount 1000 includes a (second) interconnect mechanism 1004, and the electrical interface 1002, which is supported by (secured, connected to) the interconnect mechanism 1004. The interconnect mechanism 1004 is configured to interface with (is connectable to, engageable with) the interconnect mechanism 904 in order to facilitate releasable connection of the image capture device 900 and the mount 1000 such that the image capture device 900 is movable in relation to the mount 1000 and, thus, the accessory 700 (FIG. 4), about the articulation joint J.

The interconnect mechanism 1004 includes components and features that are similar to the interconnect mechanism 528 (FIG. 4) discussed above and, accordingly, will only be discussed with respect to differences therefrom in the interest of brevity. As such, identical reference characters will be utilized to refer to elements, structures, features, etc., common to the interconnect mechanisms 528, 1004.

The interconnect mechanism 1004 includes (a set, series, plurality of) protrusions 1006 (e.g., fingers 1008) that interface with (engage, connect to) the protrusions 906 on the image capture device 900. The protrusions 1006 each include an opening 1010 and define channels 1012 therebetween. More specifically, the interconnect mechanism 1004 includes: a (first) protrusion 1006i defining a (first) opening 1010i; a (second) protrusion 1006ii defining a (second) opening 1010ii; and a (third) protrusion 1006iii defining a (third) opening 1010iii, wherein the protrusions 1006i, 1006ii define a (first) channel 1012i therebetween, and the protrusions 1006ii, 1006iii define a (second) channel 1012ii therebetween. The channels 1012i, 1012ii are respectively configured to receive the protrusions 906i, 906ii, and the channel 912 is configured to receive the protrusion 1006ii, whereby the protrusions 906 are received by (positioned within, inserted into), and nest within, the protrusions 1006, which facilitates proper alignment (registration) of the openings 910, 1010 respectively defined by the protrusions 906, 1006 during connection of the image capture device 900 and the mount 1000.

While the interconnect mechanism 1004 is shown as including three protrusions 1006 and two channels 1012 in the illustrated embodiment, it should be appreciated that the particular numbers of protrusions 1006 and channels 1012 may be varied in alternate embodiments without departing from the scope of the present disclosure (e.g., depending on the number of protrusions 906 included on the interconnect mechanism 904 on the image capture device 900).

Upon connection of the image capture device 900 and the mount 1000, the adjustable fastener 542 is inserted through the interconnect mechanisms 904, 1004 via the openings 910, 1010 respectively defined by the protrusions 906, 1006 so as to define the articulation joint J (FIG. 8). The adjustable fastener 542 can then be tightened to thereby connect (secure) the image capture device 900 and the mount 1000 and fix the position of the image capture device 900 in relation to the mount 1000 and the accessory 700 (FIG. 4), as discussed above in connection with the image capture device 100 and the mount 500 (FIGS. 4-6).

The electrical interface 1002 is in electrical communication with the power hub 526 (FIG. 4) and defines a second leg of the power and/or data path between the image capture device 900 and the mount 1000, which is completed upon connection thereof in order to facilitate the communication of power and/or data to and/or from the image capture device 900 through the articulation joint J (FIG. 8). In order to support such electrical communication, it is envisioned that the mount 1000 may include one or more transmission member(s) 1014 (FIG. 10) (e.g., conduits, wires, flexible printed circuits, etc.) that extend between the power hub 526 and the electrical interface 1002.

The electrical interface 1002 includes (a set, series, plurality of) connector pins 1016, which are supported by (secured, connected to) the protrusions 1006. More specifically, the electrical interface 1002 include a (first) pair of connector pins 1016i, 1016ii that are supported by the protrusion 1006i, and a (second) pair of connector pins 1016*iii*, 1016*iv* that are supported by the protrusion 1006*iii* (with the protrusion 1006*ii* being devoid of any connector pins 1016).

Upon connection of the image capture device 900 and the mount 1000 (e.g., upon engagement of the interconnect mechanisms 904, 1004), the connector pins 1016 interface with (contact, engage) the contact pads 914, as seen in FIG. 11, which establishes an electrical connection between the image capture device 900 and the mount 1000 that facilitates the communication of power and/or data therebetween. For example, via the transmission member(s) 1014 (FIG. 10), power and/or data is delivered from the power hub 526, across (through) the articulation joint J (FIG. 8) to the connector pins 1016, and to the contact pads 914 via contact between the electrical interfaces 902, 1002 such that the power and/data can be routed into the image capture device 900 (e.g., to the battery).

In the illustrated embodiment, the connector pins 1016 include (e.g., are formed partially or entirely from) copper. It is envisioned, however, that the connector pins 1016 may include any suitable electrically conductive material or combination of materials, whether similar (e.g., identical) to that utilized in construction of the contact pads 914, or different.

Although shown as including four connector pins 1016 in the illustrated embodiment, it should be appreciated that the particular number of connector pins 1016 may be increased or decreased in alternate embodiments (e.g., depending upon the number of contact pads 914 included on the image capture device 900) in order to vary functionality by increasing or decreasing the communication of power and/or data to and/or from the image capture device 900.

With reference to FIGS. 10 and 11, the electrical interface 1002 (e.g., the connector pins 1016) includes a dynamic (non-fixed, variable) configuration, which facilitates resilient reconfiguration of the electrical interface 1002 between an expanded (normal, initial) configuration, which is shown in FIG. 10, and a compressed (active, subsequent) configuration, which is shown in FIG. 11. Embodiments in which the electrical interface 1002 may include a fixed (static) configuration, however, are also envisioned herein, and would not be beyond the scope of the present disclosure.

When the electrical interface 1002 is in the expanded configuration, the connector pins 1016 extend into the channels 1012*i*, 1012*ii* defined between the protrusions 1006*i*, 1006*ii*, 1006*iii*. During reconfiguration of the electrical interface 1002 into the compressed (active, subsequent) configuration, the connector pins 1016 are deflected laterally outward (e.g., into the protrusions 1006*i*, 1006*iii*).

In order to facilitate reconfiguration between the expanded and compressed configurations, the electrical interface 1002 includes (a set, series, plurality of) biasing members 1018 (e.g., springs 1020). The biasing members 1018 are connected (secured) to, or otherwise engage (contact), the connector pins 1016, and bias the electrical interface 1002 towards the expanded configuration. Upon connection of the image capture device 900 and the mount 1000, the connector pins 1016 are compressed against the contact pads 914 and are deflected laterally outward, which creates a biasing force F (FIG. 11) in the electrical interface 1002. The biasing force F urges the electrical interface 1002 towards the expanded configuration and is applied to the interconnect mechanism 904, which not only maintains an electrical connection between the electrical interfaces 902, 1002 while permitting relative movement between the image capture device 900 and the mount 1000 (e.g., during dynamic use cases), but allows for minor misalignments between the contact pads 914 and the connector pins 1016, as well as tolerance variations.

While the electrical interfaces 902, 1002 are respectively shown as including the contact pads 914 and the connector pins 1016 in FIGS. 8-11, embodiments are also envisioned in which the configurations of the electrical interfaces 902, 1002 may be reversed such that the electrical interface 902 (e.g., the contact pads 914) are included on the mount 1000, and the second electrical interface 1002 (e.g., the connector pins 1016) are included on the image capture device 900, and would not be beyond the scope of the present disclosure.

In order to facilitate continued performance in the presence of water, moisture, dust, debris, etc., the accessory mounting system 800 includes (a set, series, plurality of) sealing members 1100 that collectively seal off and conceal the electrical interfaces 902, 1002 in order to reduce (if not entirely eliminate) fluid pathways thereto. It is envisioned that the sealing members 1100 may be supported by (secured, connected to) the image capture device 900 and/or the mount 1000, and that the sealing members 1100 may include (e.g., may be formed from) any suitable material or combination of materials.

In the illustrated embodiment, the accessory mounting system 800 includes a plurality of gaskets 1102 and a plurality of O-rings 1104. The gaskets 1102 are supported within (are received by) recesses 1022 (FIGS. 9, 10) that are defined by the protrusions 1006 such that the gaskets 1102 extend about the contact pads 914 and the connector pins 1016, and the O-rings 1104 are supported within (are received by) channels 556 (FIG. 9) that are defined by the adjustable fastener 542.

Figure 12:
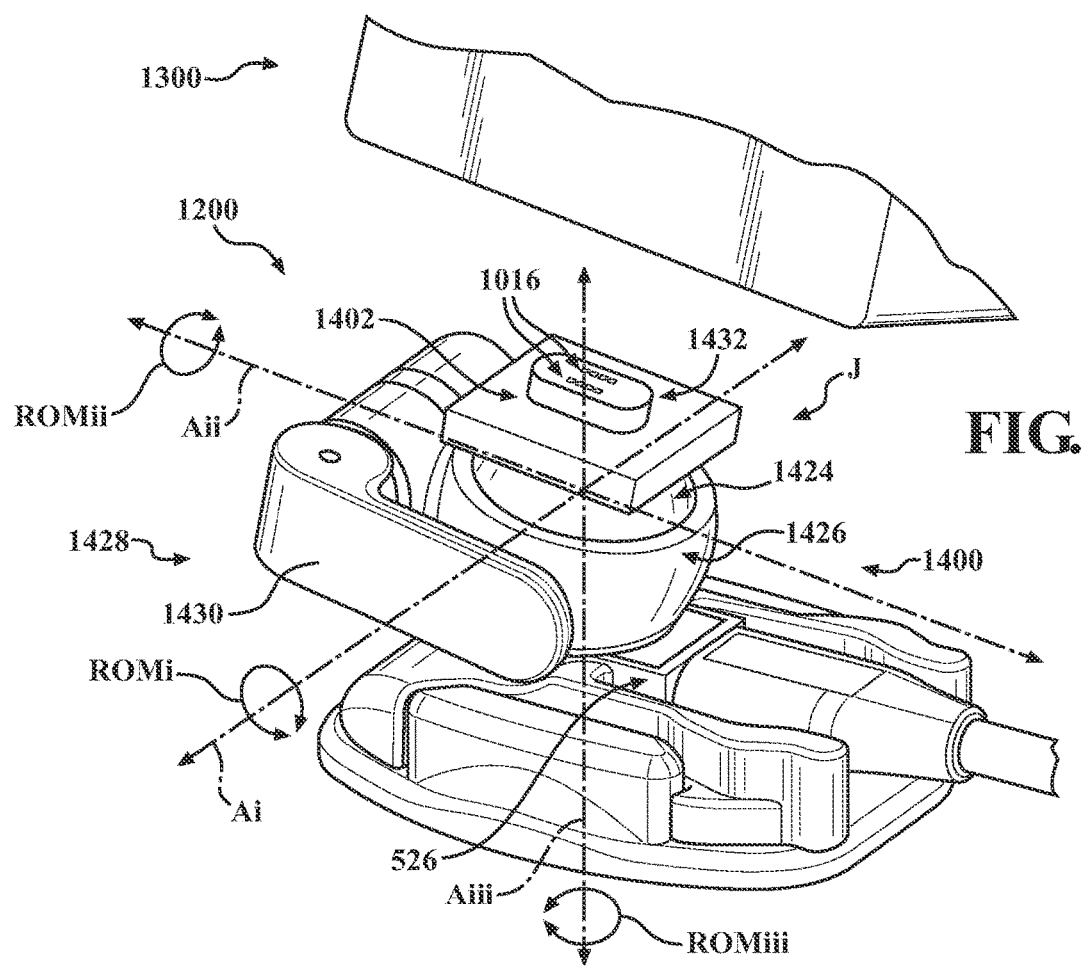
FIG. 12 is a partial, side, perspective view of another embodiment of the accessory mounting system, which includes alternate embodiments of the image capture device and the mount.
Figure 13:
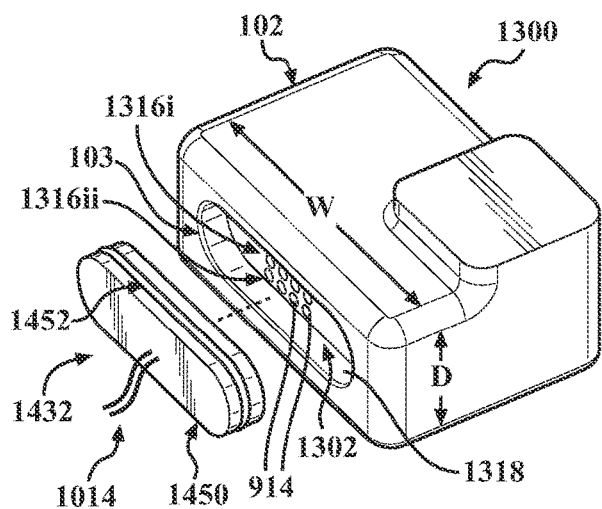
FIG. 13 is a partial, bottom, perspective view of the accessory mounting system seen in FIG. 12 illustrating connection of the image capture device and the mount.
Figure 14:
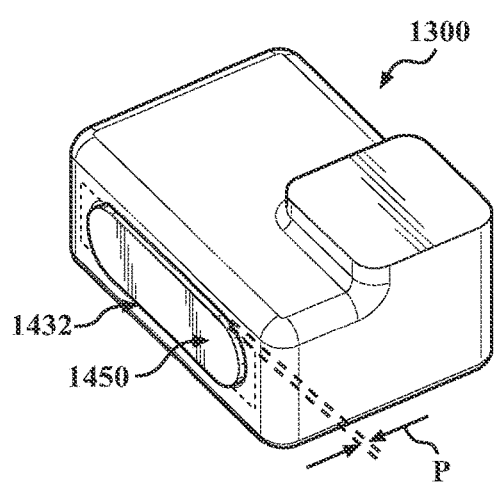
FIG. 14 is a partial, bottom, perspective view of the accessory mounting system seen in FIG. 12 upon connection of the image capture device and the mount.
Figure 15:
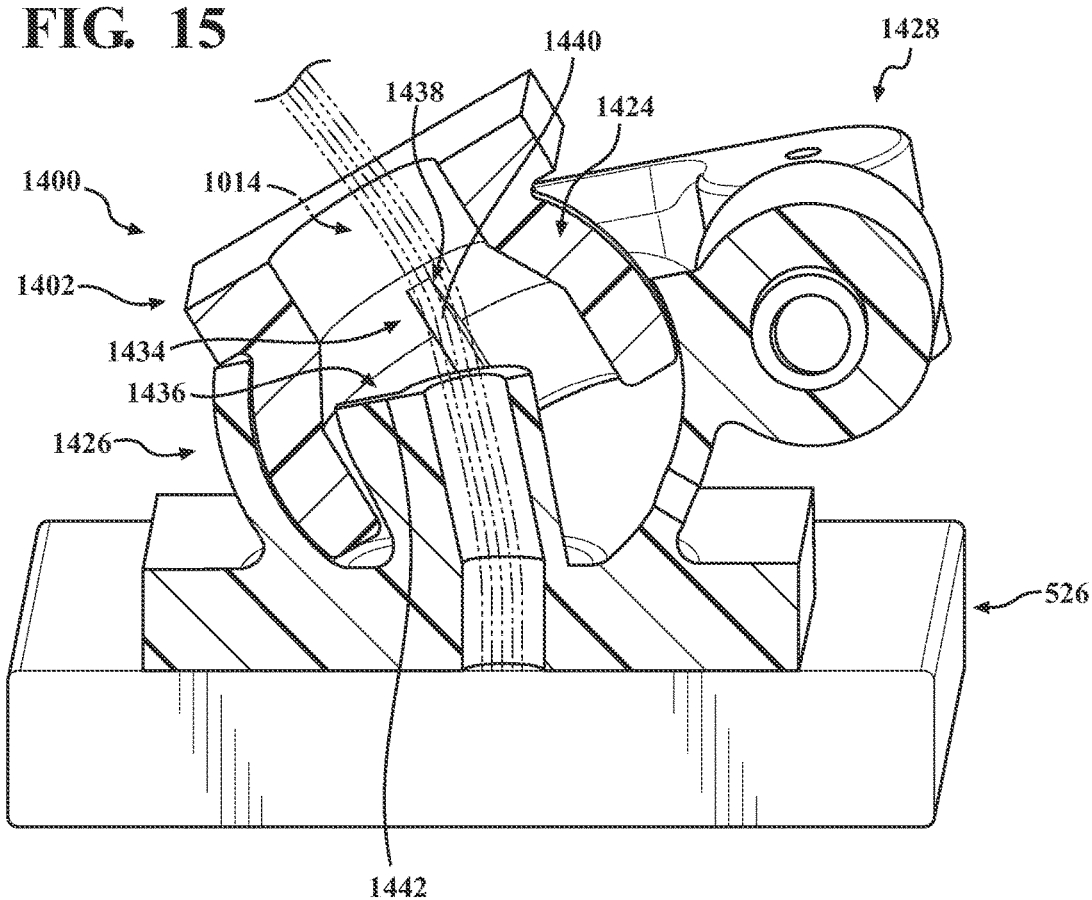
FIG. 15 is a partial, longitudinal (vertical), cross-sectional view of the mount seen in FIG. 12.

With reference now to FIGS. 12-15, and accessory mounting system 1200 will be discussed, which is an alternate embodiment of the accessory mounting system 800. The accessory mounting system 1200 includes an image capture device 1300 and a mount 1400, which are alternate embodiments of the image capture device 900 and the mount 1000, respectively. More specifically, FIG. 12 is a partial, side, perspective view of the accessory mounting system 1200 with the image capture device 1300 and the mount 1400 shown separated; FIG. 13 is a partial, bottom, perspective view of the accessory mounting system 1200 illustrating connection of the image capture device 1300 and the mount 1400; FIG. 14 is a partial, bottom, perspective view of the accessory mounting system 1200 upon connection of the image capture device 1300 and the mount 1400; and FIG. 15 is a partial, longitudinal (vertical), cross-sectional view of the mount 1400.

Like the accessory mounting system 800 (FIGS. 8-11), the accessory mounting system 1200 provides a durable, waterproof interface between the image capture device 1300 and the mount 1400, which include corresponding (first and second) electrical interfaces 1302 (FIG. 13), 1402 (FIG. 12). As discussed in connection with the accessory mounting system 800, the electrical interfaces 1302, 1402 are configured for direct contact with each other to facilitate power and/or data communication to and/or from the image capture device 1300 upon connection of the image capture device 1300 and the mount 1400.

The image capture device 1300, the mount 1400, and the electrical interfaces 1302, 1402 include components and features that are similar to the image capture device 900, the mount 1000, and the electrical interfaces 902, 1002 (FIGS. 8-11) discussed above and, accordingly, will only be discussed with respect to differences therefrom in the interest of brevity. As such, identical reference characters will be utilized to refer to elements, structures, features, etc., common to the image capture devices 900, 1300, the mounts 1000, 1400, the electrical interfaces 902, 1302, and the electrical interfaces 1002, 1402.

The electrical interface 1302 replaces the interconnect mechanism 904 (FIGS. 8, 9), and includes the contact pads 914. More specifically, the electrical interface 1302 is located within the cavities 103 extending into the body 102 of the image capture device 1300, and, in the illustrated embodiment, includes eight contact pads 914 that are arranged into generally parallel rows 1316i, 1316ii that extend in generally parallel relation to a width W of the image capture device 1300.

Figure 22:
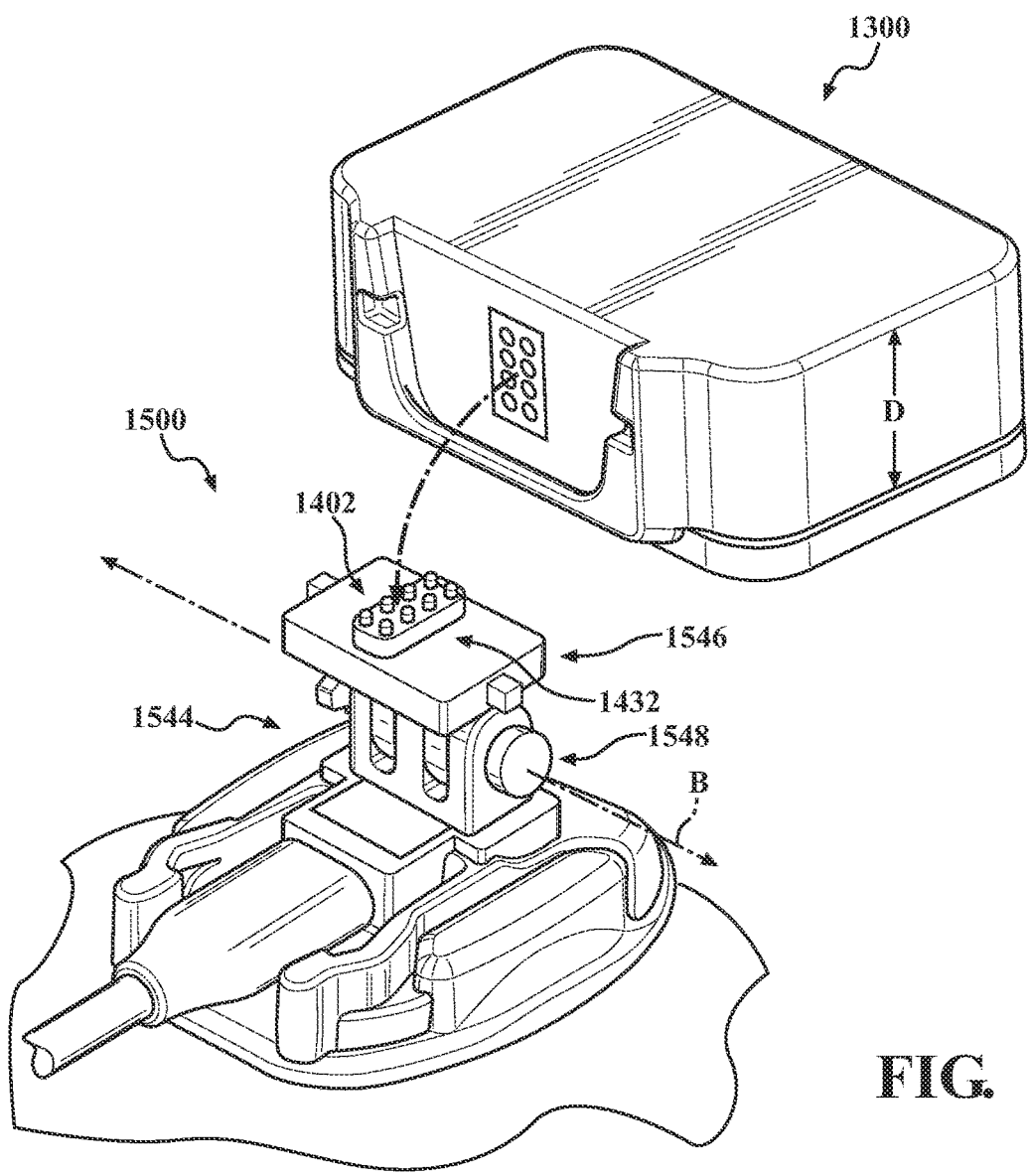
FIG. 22 is a front, perspective view of another embodiment of the accessory mounting system, which includes alternate embodiments of the image capture device and the mount.

Although shown as including eight contact pads 914 in the illustrated embodiment, it should be appreciated that the particular number of contact pads 914, and/or the orientation thereof, may be varied in alternate embodiments without departing from the present disclosure (e.g., in order to vary functionality by increasing or decreasing the communication of power and/or data to and/or from the image capture device 1300). For example, an embodiment in which the rows 1316 of the contact pads 914 may extend in generally parallel relation to a depth D of the image capture device 1300 is also envisioned herein, as seen in FIG. 22, which is discussed in further detail below. Additionally, while the contact pads 914 are shown as being surface mounted to the image capture device 1300 (e.g., within the cavities 103), embodiments in which the contact pads 914 may be embedded within (recessed into) the body 102 of the image capture device 1300 are also envisioned herein and would not be beyond the scope of the present disclosure.

The mount 1400 includes a ball linkage 1424 and a socket 1426, which are alternate embodiments of the ball linkage 552 and the socket 554 discussed above with respect to FIG. 7, respectively, and include components and features that are similar thereto. As such, the ball linkage 1424 and the socket 1426 will only be discussed with respect to differences from the ball linkage 552 and the socket 554 in the interest of brevity, and identical reference characters will be utilized to refer to elements, structures, features, etc., common to the ball linkages 552, 1424 and the sockets 554, 1426.

In addition to the ball linkage 1424 and the socket 1426, the mount 1400 includes a fastener 1428, and the electrical interface 1402.

The fastener 1428 is configured as a cam latch 1430, which renders the fastener 1428 captive to the mount 1400 so as to eliminate any separable components.

The electrical interface 1402 is configured as a (power and/or data) pad 1432 that is in electrical communication with the power hub 526 (FIGS. 4, 12, 15), which allows power and/or data to be communicated from the power hub 526 to the electrical interface 1402 across (through) the articulation joint J (FIG. 12) via the transmission member(s) 1014. More specifically, as seen in FIG. 15, the transmission member(s) 1014 extend from the power hub 526, through the socket 1426 and the ball linkage 1424, to the electrical interface 1402.

Figure 16:
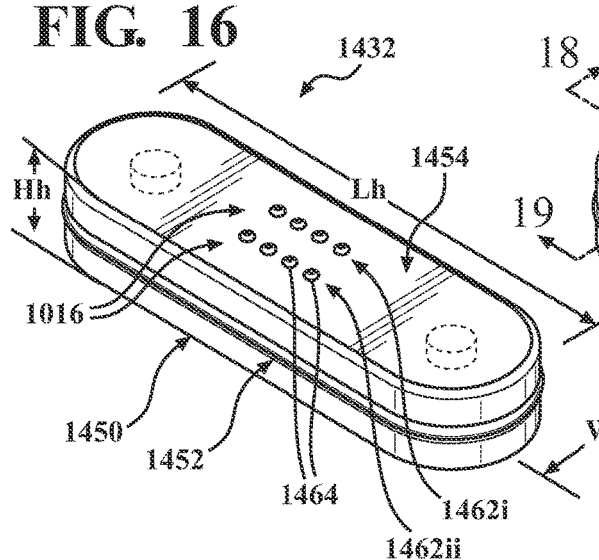
FIG. 16 is a top, perspective view of a (power and/or data) pad included on the mount seen in FIG. 12, which is shown separated therefrom.
Figure 17:
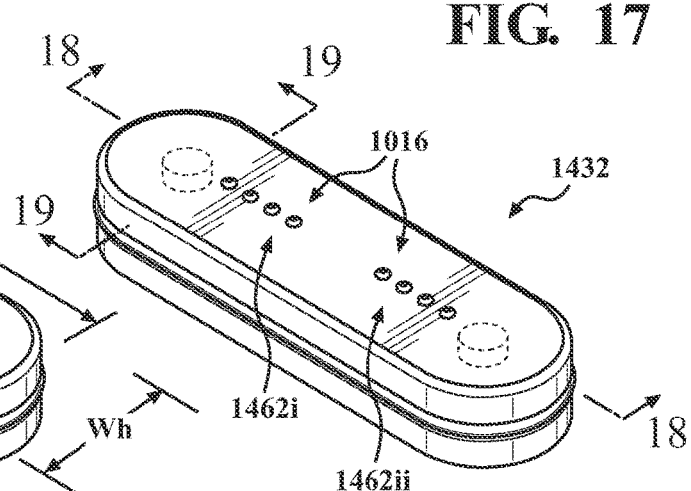
FIG. 17 is a top, perspective view of an alternate embodiment of the pad seen in FIG. 16.
Figure 18:
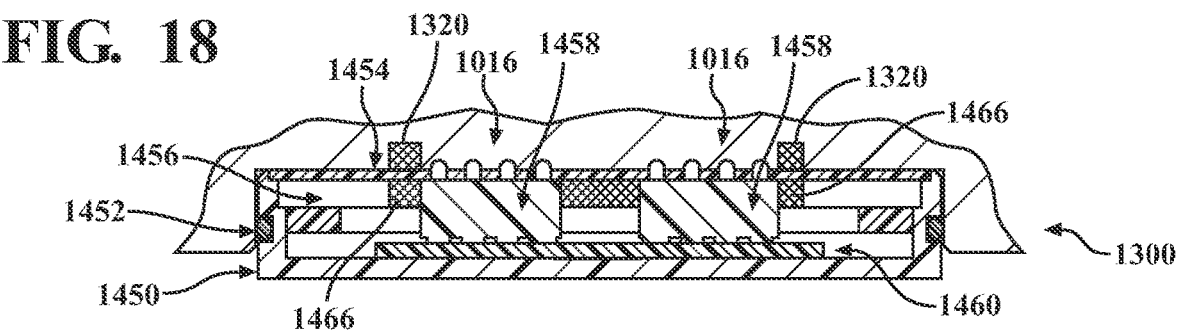
FIG. 18 is a partial, longitudinal (vertical), cross-sectional view of the pad taken along line 18-18 in FIG. 17 and shown with the image capture device.
Figure 19:
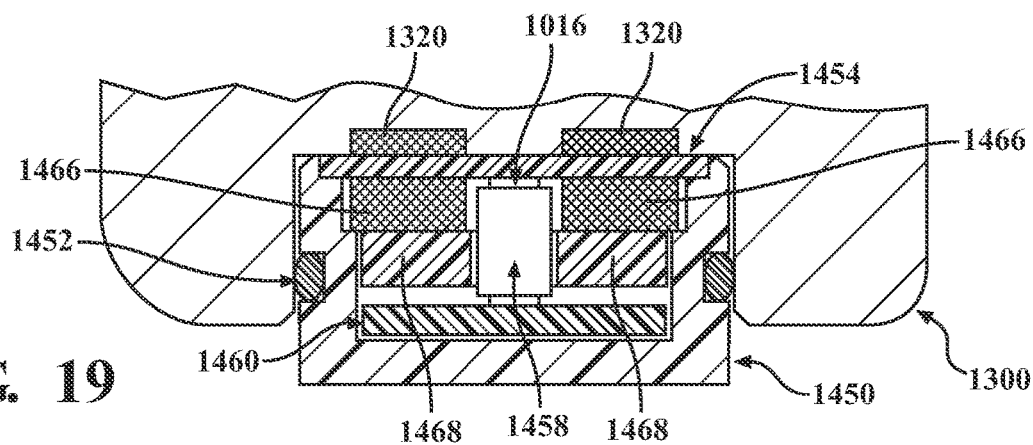
FIG. 19 is a partial, longitudinal (vertical), cross-sectional view of the pad taken along line 19-19 in FIG. 17 and shown with the image capture device.
Figure 20:
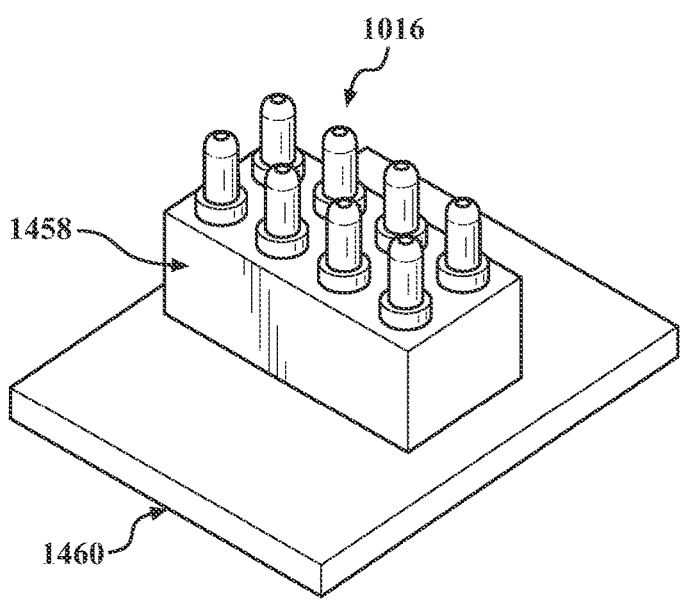
FIG. 20 is a partial, top, perspective view of the pad seen in FIG. 16 illustrating various electrical and/or structural components thereof.
Figure 21:
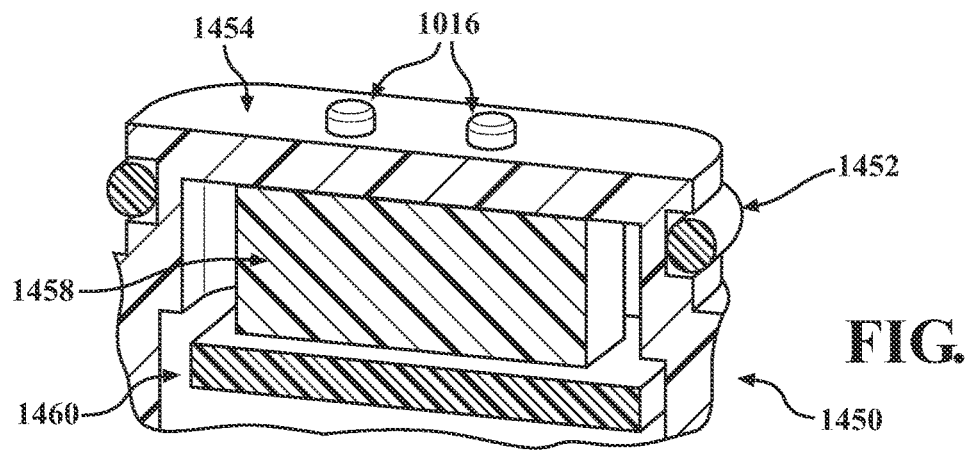
FIG. 21 is a partial, longitudinal (vertical), cross-sectional view of the pad seen in FIG. 16, which is shown in perspective.

With reference now to FIGS. 16-21 as well, the electrical interface 1402 (e.g., the pad 1432) will be discussed. More specifically, FIG. 16 is a top, perspective view of the pad 1432 included on the mount 1400, which is shown separated therefrom; FIG. 17 is a top, perspective view of an alternate embodiment of the pad 1432 shown separated from the mount 1400; FIG. 18 is a partial, longitudinal (vertical), cross-sectional view of the pad 1432 taken along line 18-18 in FIG. 17 and shown with the image capture device 1300; FIG. 19 is a partial, longitudinal (vertical), cross-sectional view of the pad 1432 taken along line 19-19 in FIG. 17 and shown with the image capture device 1300; FIG. 20 is a partial, top, perspective view of the pad 1432; and FIG. 21 is a partial, longitudinal (vertical), cross-sectional view of the pad 1432, which is shown in perspective.

The electrical interface 1402 (e.g., the pad 1432) is supported by the ball linkage 1424, which allows for articulation of the electrical interface 1402 and the image capture device 1300 about a plurality of axes A (FIG. 12) (e.g., a (first) axis Ai, a (second) axis Aii, and a (third) axis Aiii). More specifically, in the illustrated embodiment, the mount 1400 is configured such that the ball linkage 1424 is movable through a (first) range of motion ROMi (about the axis Ai) that lies substantially within the range of (approximately) 30° to (approximately) 50° (e.g., (approximately) 40°), a (second) range of motion ROMii (about the axis Aii) that lies substantially within the range of (approximately) 10° to (approximately) 30° (e.g., (approximately) 20°), and a (third) range of motion ROMiii (about the axis Aiii) that lies substantially within the range of (approximately) 330° to (approximately) 350° (e.g., (approximately) 340°). Embodiments in which the mount 1400 may be configured such that one or more of the ranges of motion ROMi, ROMii, ROMiii lies outside the disclosed range are also envisioned herein (e.g., depending upon the particular configuration and/or the intended use of the image capture device 1300), however, and would not be beyond the scope of the present disclosure.

In order to protect the transmission member(s) 1014, the range of motion ROMiii about the axis Aiii is limited (e.g., to less than 360°) by anti-rotation features 1434, 1436 that are included on the ball linkage 1424 and the socket 1426, respectively. For example, in the illustrated embodiment, the ball linkage 1424 includes a projection 1438 (e.g., a rib 1440, a detent, etc.) that is configured for engagement (contact) with a stop 1442 on the socket 1426. It should be appreciated, however, that the particular configurations of the anti-rotation features 1434, 1436 may be varied in alternate embodiments without departing from the scope of the present disclosure. For example, it is envisioned that the range of motion ROMiii may be increased or decreased by varying the configuration (e.g., the dimensions) of the anti-rotation feature 1434 and/or the anti-rotation feature 1436.

Although illustrated as including the ball linkage 1424 and the socket 1426 in FIGS. 12 and 15, it is envisioned that the particular configuration of the mount 1400 may be varied in alternate embodiments without departing from the scope of the present disclosure. For example, FIG. 22 illustrates an accessory mounting system 1500, which includes an image capture device 1600 and a mount 1700, which are alternate embodiments of the image capture device 1300 and the mount 1400, respectively. More specifically, FIG. 22 is a side, perspective view of the accessory mounting system 1500 with the image capture device 1600 shown separated from the mount 1700. The mount 1700 includes: a base 1744; a platform 1746 that is pivotably connected to the base 1744 and which supports the electrical interface 1402 (e.g., the pad 1432); and a fastener 1748, which extends through the base 1744 and the platform 1746. In contrast to the mount 1400 (FIGS. 12, which is articulable (rotatable) in multiple directions, the mount 1700 is articulable about a single axis B, which is defined by the fastener 1748.

With reference again to FIGS. 12-21, the pad 1432 is configured to interface with the image capture device 1300 in order to facilitate the communication of power and/or data between the image capture device 1300 and the mount 1400. As described in detail below, the pad 1432 includes: a housing 1450; one or more sealing members 1452; and a top plate (cover) 1454.

The housing 1450 accommodates various electrical and/or structural components 1456 (FIG. 18), including the connector pins 1016, and defines a length Lh, a width Wh, and a height Hh. More specifically, in the illustrated embodiment, the housing 1450 is configured such that the length Lh lies substantially within the range of (approximately) 40 mm to (approximately) 60 mm (e.g., (approximately) 50 mm), the width Wh lies substantially within the range of (approximately) 10 mm to (approximately) 20 mm (e.g., (approximately) 15 mm), and the height Hh lies substantially within the range of (approximately) 6 mm to (approximately) 12 mm (e.g., (approximately) 8 mm). Embodiments in which the pad 1432 may be configured such that the length Lh, the width Wh, and/or the height Hh lie outside the disclosed ranges are also envisioned herein (e.g., depending upon the particular configuration of the image capture device 1300, the particular configuration of the mount 1400, etc.), however, and would not be beyond the scope of the present disclosure.

As seen in FIGS. 13 and 14, upon connection of the image capture device 1300 and the mount 1400, the housing 1450 is received within the cavities 103. It the illustrated embodiment, the housing 1450 and the image capture device 1300 (e.g., the cavities 103) are configured such that the housing 1450 protrudes therefrom by a distance P that lies substantially within the range of (approximately) 1 mm to (approximately) 3 mm (e.g., (approximately) 2 mm). Embodiments in which the housing 1450 and the image capture device 1300 (e.g., the cavities 103) may be configured such that the distance P lies outside the disclosed range are also envisioned herein (e.g., depending upon the particular configuration of the mount 1400, the particular configuration of the image capture device 1300, etc.), however, and would not be beyond the scope of the present disclosure. For example, an embodiment in which the housing 1450 and the image capture device 1300 may be configured such that the housing 1450 is flush mounted with the body 102 of the image capture device 1300 upon connection with the mount 1400 is also envisioned herein.

In addition to the connector pins 1016, the housing 1450 accommodates one or more supports 1458, which receive and brace the connector pins 1016, and a PCB 1460, which is connected to the transmission member(s) 1014 (FIGS. 13, 15). As seen in FIGS. 18 and 19, the connector pins 1016 extend through the support(s) 1458 and are connected (secured) (e.g., soldered) to the PCB 1460, which allows power and/or data to be communicated to and/or from the connector pins 1016 via the PCB 1460.

Although shown as including the PCB 1460 throughout the figures, it is envisioned that the PCB 1460 may be replaced by any structure, substrate, component, etc., that is suitable for the intended purpose of facilitating the communication of power and/or data to and/or from the connector pins 1016 in the manner described herein.

The pad 1432 includes eight connector pins 1016, which are arranged into generally parallel rows 1462i, 1462ii (FIG. 16) that extend in generally parallel relation to the rows 1316i, 1316ii (FIG. 13) of the contact pads 914 on the image capture device 1300. In the embodiment illustrated in FIG. 17, by contrast, the rows 1462i, 1462ii are oriented in an end-to-end, colinear configuration.

Although the pad 1432 is shown as including eight connector pins 1016, it should be appreciated that the particular number of connector pins 1016, and/or the orientation thereof, may be varied in alternate embodiments without departing from the present disclosure (e.g., in order to vary functionality by increasing or decreasing the communication of power and/or data to and/or from the image capture device 1300), as discussed above in connection with the contact pads 914.

As discussed above in connection with the mount 1000 (FIGS. 8-11), upon connection of the image capture device 1300 and the mount 1400, the connector pins 1016 interface with the contact pads 914, which establishes an electrical connection between the image capture device 1300 and the mount 1400 that facilitates the communication of power and/or data therebetween. For example, via the transmission member(s) 1014 (FIGS. 13, 15), power and/or data is delivered from the power hub 526 (FIGS. 4, 12, 15), across (through) the articulation joint J, to the connector pins 1016 through the PCB 1460, and to the contact pads 914 via contact between the electrical interfaces 1302, 1402 such that the power and/data can be routed into the image capture device 1300.

While the electrical interfaces 1302, 1402 are shown as including the contact pads 914 and the connector pins 1016 in FIGS. 12-21, embodiments are also envisioned in which the configurations of the electrical interfaces 1302, 1402 may be reversed such that the electrical interface 1302 (e.g., the contact pads 914) are included on the mount 1400, and the electrical interface 1402 (e.g., the connector pins 1016) are included on the image capture device 1300, and would not be beyond the scope of the present disclosure.

With reference to FIG. 13 in particular, the sealing member(s) 1452 extend radially (laterally) outward from the housing 1450, and are configured for engagement (contact) with the body 102 of the image capture device 1300 in order to facilitate continued performance of the accessory mounting system 1200 in the presence of water, moisture, dust, debris, etc. More specifically, the sealing member(s) 1452 engage (contact) inner walls 1318 of the cavities 103, which seals off and conceals the electrical interfaces 1302, 1402 in order to reduce (if not entirely eliminate) fluid pathways thereto.

The top plate 1454 is connected (secured) to the housing 1450, which conceals and protects the electrical and/or structural components 1456 (e.g., the support(s) 1458, the PCB 1460, etc.) in order to inhibit (if not entirely prevent) the entry of water, moisture, dust, debris, etc., into the pad 1432. It is envisioned that the top plate 1454 and the housing 1450 may be connected (secured) together in any suitable manner. For example, it is envisioned that the top plate 1454 and the housing 1450 may be connected (secured) together via one or more mechanical fasteners (e.g., one or more pins, set screws, clips, etc.), via an adhesive, or the like.

The top plate 1454 includes (a set, series, plurality of) openings 1464 that receive the connector pins 1016 such that the connector pins 1016 extend therethrough, which allows the connector pins 1016 to interface with (contact, engage) the contact pads 914 upon connection of the image capture device 1300 and the mount 1400.

As discussed above, upon connection of the image capture device 1300 and the mount 1400, the connector pins 1016 are compressed against the contact pads 914, which reconfigures the electrical interface 1402 from the expanded configuration into the compressed configuration, and creates the biasing force F.

In order to resist and overcome the biasing force F, and facilitate proper connection (engagement) and registration (alignment) of the image capture device 1300 and the mount 1400, the image capture device 1300 and the mount 1400 include one or more corresponding magnetic members 1320, 1466, respectively.

It is envisioned that the magnetic member(s) 1466 may be provided by the top plate 1454 by incorporating one or more magnetic materials into the construction thereof. Additionally, or alternatively, it is envisioned that the magnetic member(s) 1466 may be provided as separate, discrete components of the pad 1432. For example, it is envisioned that the magnetic member(s) 1466 may be secured to the top plate 1454, that the magnetic member(s) 1466 may extend through the top plate 1454, or that the magnetic member(s) 1466 may be located internally within the housing 1450 such that the magnetic member(s) 1466 are concealed by the top plate 1454, as seen in FIGS. 18 and 19. In such embodiments, in order to increase the strength of the magnetic member(s) 1466 and, thus, the connection between the image capture device 1300 and the mount 1400, it is envisioned that the mount 1400 (e.g., the pad 1432) may include one or more (ferrous) bolsters 1468 (FIGS. 18, 19) that are located within the housing 1450 in adjacent (e.g., contacting) relation to the magnetic member(s) 1466.

Figure 24:
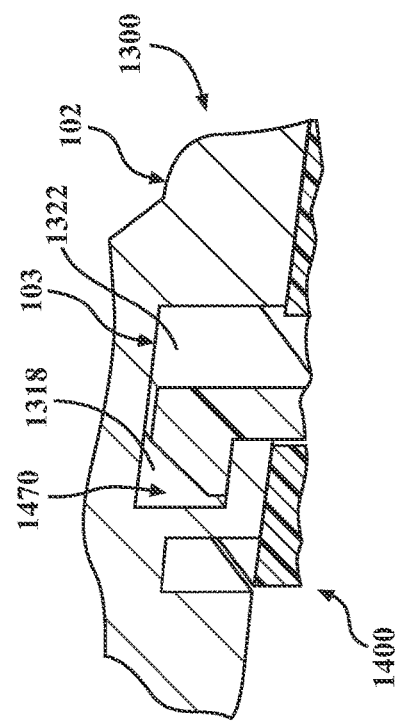
FIG. 24 is a partial, longitudinal (vertical), cross-sectional view of the mount and the clips seen in FIG. 23, which is shown in perspective with the clips in the normal configuration and inserted into receptacles in the image capture device.
Figure 26:
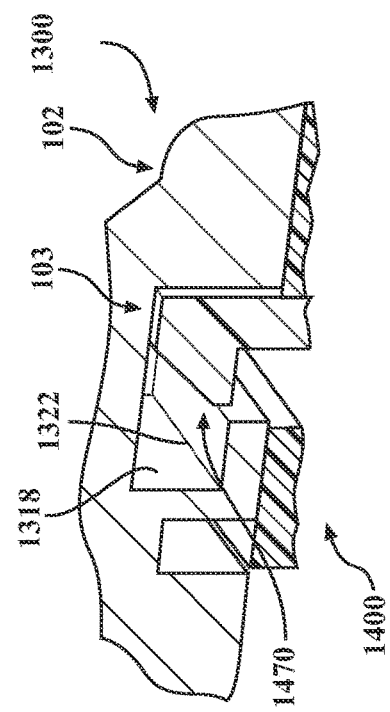
FIG. 26 is a partial, longitudinal (vertical), cross-sectional view of the mount and the clips seen in FIG. 25, which is shown in perspective with the clips in the deflected configuration and inserted into the receptacles in the image capture device.
Figure 23:
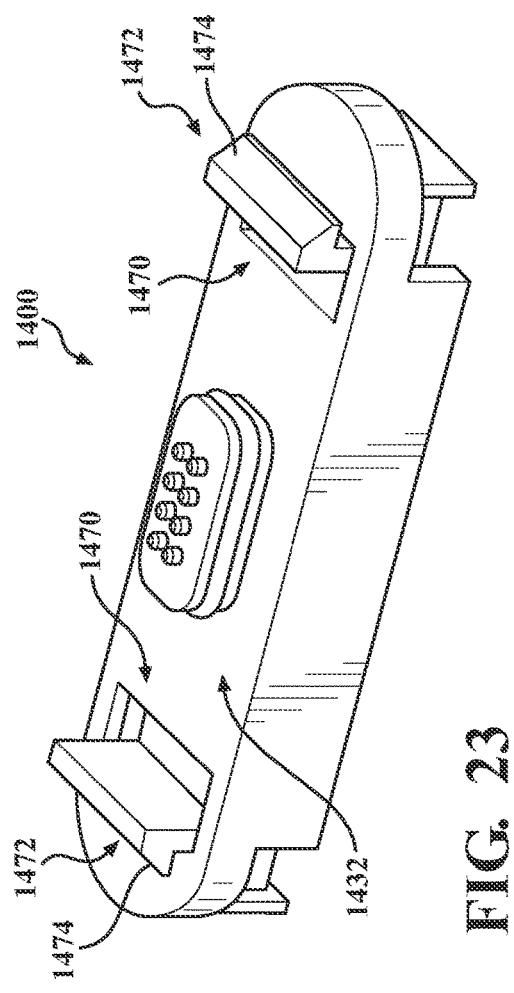
FIG. 23 is a partial, top, perspective view of one embodiment of the mount including clips that are configured to mechanically connect the mount and the image capture device, which are shown in a normal (initial) configuration.
Figure 25:
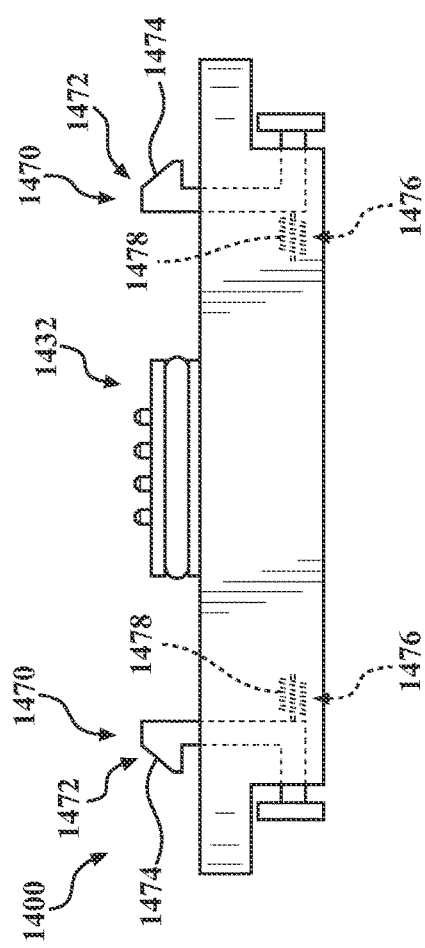
FIG. 25 is a partial, side, plan view of the mount and the clips seen in FIG. 23, which are shown in a deflected (subsequent) configuration.

With reference now to FIGS. 23-26 as well, in addition to the magnetic interface established by the magnetic members 1320, 1466 respectively included on the image capture device 1300 and the mount 1400, or as an alternative thereto, it is envisioned that the image capture device 1300 and the mount 1400 may be configured for mechanical connection (engagement). For example, it is envisioned that the mount 1400 may include clips 1470 that are configured for insertion into to corresponding receptacles 1322 (e.g., channels, openings, indentations, etc.) on the body 102 of the image capture device 1300. More specifically, FIG. 23 is a partial, top, perspective view of the mount 1400 with the clips 1470 in a normal (initial) configuration; FIG. 24 is a partial, longitudinal (vertical), cross-sectional view of the mount 1400 and the image capture device 1300, which is shown in perspective with the clips 1470 in the normal configuration and inserted into the receptacles 1322; FIG. 25 is a partial, side, plan view of the mount 1400 with the clips 1470 in a deflected (subsequent) configuration; and FIG. 26 is a partial, longitudinal (vertical), cross-sectional view of the mount 1400 and the image capture device 1300, which is shown in perspective with the clips 1470 in the deflected configuration and inserted into the receptacles 1322.

In the embodiment illustrated in FIGS. 23-26, the clips 1470 include retainers 1472 (e.g., teeth 1474) that are oriented radially (laterally) outward, and which are configured for insertion into receptacles 1322 that are defined by the inner walls 1318 of the cavities 103. During connection of the image capture device 1300 and the mount 1400, the clips 1470 are reconfigured from the normal configuration (FIGS. 23, 24) into the deflected configuration (FIGS. 25, 26). Upon insertion of the mount 1400 into the cavities 103, the clips 1470 are automatically returned to normal configuration, whereby the retainers 1472 engage (contact) the body 102 of the image capture device 1300 (e.g., the receptacles 1322), as seen in FIG. 24, to thereby connect (secure) together the image capture device 1300 and the mount 1400.

In order to facilitate return of the clips 1470 to the normal configuration, it is envisioned that the pad 1432 may include one or more (internal) biasing members 1476 (FIG. 25) (e.g., coil springs 1478) that engage (contact) the clips 1470 so as to urge the clips 1470 radially (laterally) outward.

Figure 27:
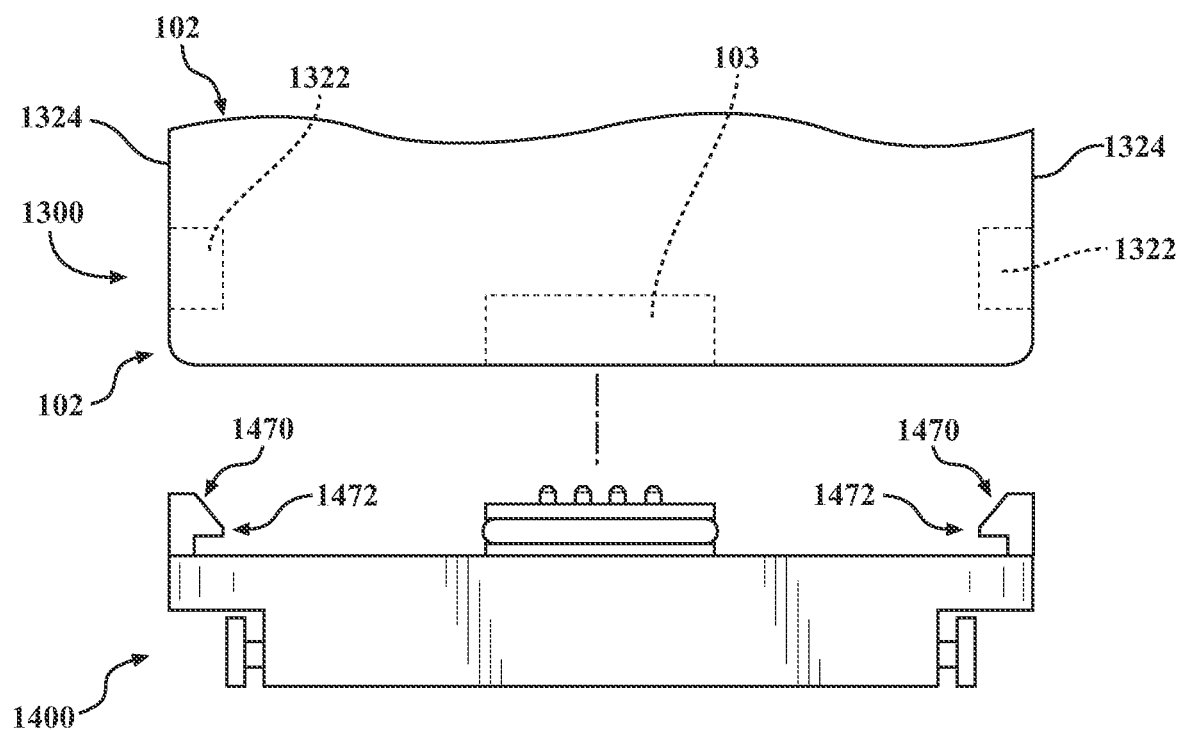
FIG. 27 is a partial, side, plan view of another embodiment of the mount and the clips seen in FIGS. 23-26.

FIG. 27 is a partial, side, plan view of an alternate embodiment of the mount 1400 in which the configurations of the clips 1470 (e.g., the retainers 1472) are reversed. More specifically, in the embodiment illustrated in FIG. 27, the retainers 1472 are oriented radially (laterally) inward, which facilitates insertion of the retainers 1472 into receptacles 1322 that are defined by side surfaces 1324 of the body 102 of the image capture device 1300.

Figure 28:
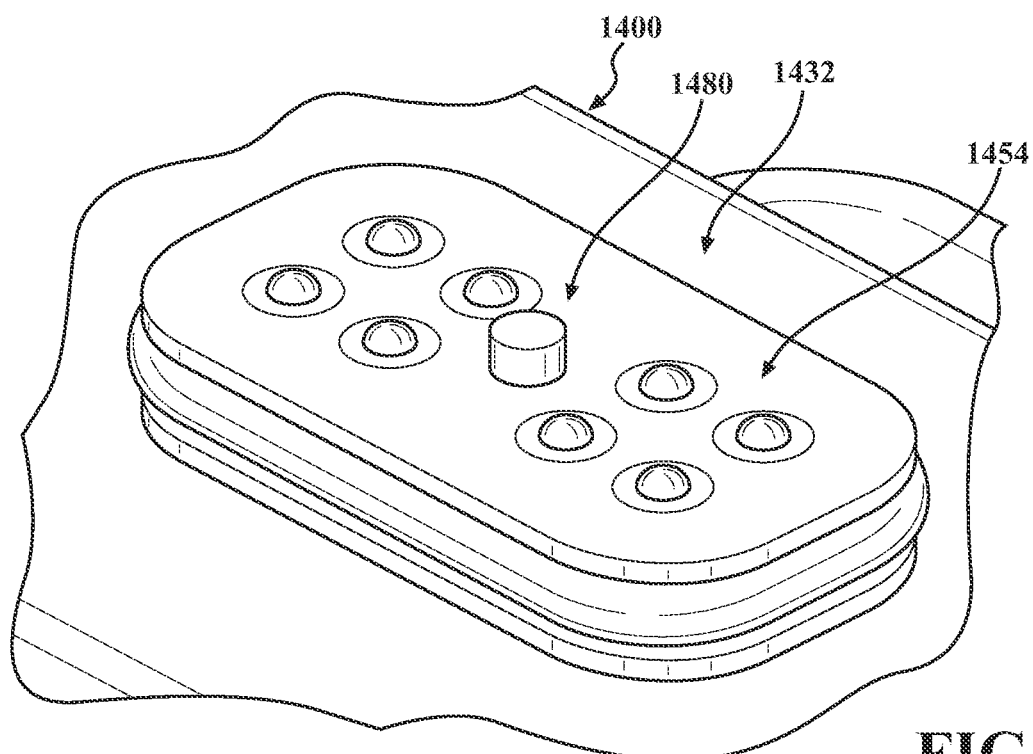
FIG. 28 is a partial, top, perspective view of another embodiment of the mount in which the pad includes a switch.

In certain embodiments of the disclosure, it is envisioned that the mount 1400 (e.g., the pad 1432) may include a switch 1480, as seen in FIG. 28. More specifically, FIG. 28 is a partial, top, perspective view of the mount 1400 and illustrating the switch 1480, which is configured for engagement (contact) with the body 102 of the image capture device 1300 in order to inform the image capture device 1300 and/or the mount 1400 of proper connection prior to initiating the communication of power and/or data therebetween.

Although shown as extending through the top plate 1454 in the embodiment illustrated in FIG. 28, it is envisioned that the switch 1480 may be positioned in any suitable location.

While the present disclosure has been described in connection with certain embodiments, it is to be understood that the present disclosure is not to be limited to the disclosed embodiments, but, on the contrary, is intended to cover various modifications and equivalent arrangements included within the scope of the appended claims, which scope is to be accorded the broadest interpretation so as to encompass all such modifications and equivalent structures as is permitted under the law.

Persons skilled in the art will understand that the various embodiments of the present disclosure and shown in the accompanying figures constitute non-limiting examples, and that additional components and features may be added to any of the embodiments discussed hereinabove without departing from the scope of the present disclosure. Additionally, persons skilled in the art will understand that the elements and features shown or described in connection with one embodiment may be combined with those of another embodiment without departing from the scope of the present disclosure to achieve any desired result and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the present disclosure, as are alternative embodiments that may result from combining, integrating, and/or omitting features from any of the disclosed embodiments.

Use of the term "optionally" with respect to any element of a claim means that the element may be included or omitted, with both alternatives being within the scope of the claim. Additionally, use of broader terms such as "comprises," "includes," and "having" should be understood to provide support for narrower terms such as "consisting of," "consisting essentially of," and "comprised substantially of." Accordingly, the scope of protection is not limited by the description set out above, but is defined by the claims that follow, and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "left," "right," "upward," "downward," "inward," "outward," "horizontal," "vertical," etc., should be understood to describe a relative relationship between the structures and/or a spatial orientation of the structures. Those skilled in the art will also recognize that the use of such terms may be provided in the context of the illustrations provided by the corresponding figure(s).

Additionally, terms such as "generally," "approximately," "substantially," and the like should be understood to include the numerical range, concept, or base term with which they are associated as well as variations in the numerical range, concept, or base term on the order of 25% (e.g., to allow for manufacturing tolerances and/or deviations in design). For example, the term "generally orthogonal" should be understood as referring to an arrangement in which the pertinent components (structures, elements) subtend an angle therebetween that is equal to 90° as well as an arrangement in which the pertinent components (structures, elements) subtend an angle therebetween that is greater than or less than 90° (e.g., ±25%). The term "generally orthogonal" should thus be understood as encompassing configurations in which the pertinent components are arranged in orthogonal relation.

Although terms such as "first," "second," "third," etc., may be used herein to describe various operations, elements, components, regions, and/or sections, these operations, elements, components, regions, and/or sections should not be limited by the use of these terms in that these terms are used to distinguish one operation, element, component, region, or section from another. Thus, unless expressly stated otherwise, a first operation, element, component, region, or section could be termed a second operation, element, component, region, or section without departing from the scope of the present disclosure.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:

1. A mount configured to connect an image capture device to an accessory, the mount comprising:
   a female component configured for connection to the accessory; and
   a male component configured for removable insertion into the female component, the male component including:
      a body;
      a first interconnect mechanism supported by the body and configured to interface with a second interconnect mechanism on the image capture device to facilitate removable connection of the image capture device and the mount;
      deflectable arms supported by the body such that the deflectable arms are resiliently repositionable between an engaged position, in which the deflectable arms engage the female component to thereby connect the male component and the female component, and a disengaged position, in which the deflectable arms are disengaged from the female component to allow for disconnection of the male component from the female component; and
      a power hub supported by the body and configured to receive a power cord to thereby deliver power and/or data to the mount, the power hub located between the deflectable arms such that, upon connection of the power cord to the power hub, the power cord inhibits repositioning of the deflectable arms from the engaged position to the disengaged position to thereby maintain connection of the male component and the female component.

2. The mount of claim 1, wherein the first interconnect mechanism includes first fingers extending from the male component and defining channels therebetween, the second interconnect mechanism including second fingers extending from the image capture device and configured for insertion into the channels.

3. The mount of claim 1, wherein the male component is configured such that the deflectable arms define vertical uppermost surfaces generally aligned with a lower end of the power hub to thereby reduce an overall height of the male component.

4. The mount of claim 1, wherein the male component is configured for disconnection from the female component upon deflection of the deflectable arms beyond a threshold release distance less than a maximum transverse cross-sectional dimension defined by the power cord.

5. The mount of claim 4, wherein the male component is configured such that the threshold release distance is approximately 6 mm.

6. The mount of claim 1, wherein the male component is configured for slidable insertion into the female component along a first axis.

7. The mount of claim 6, wherein the power hub is configured such that the power cord is connectable thereto via advancement along a second axis extending in generally parallel relation to the first axis.

8. The mount of claim 7, wherein the female component includes stops and the deflectable arms include locking members configured for engagement with the stops when the deflectable arms are in the engaged position to thereby inhibit removal of the male component from the female component.

9. The mount of claim 8, wherein the power hub defines an end wall spaced inwardly from the locking members along the second axis.

10. The mount of claim 8, wherein the locking members are positioned laterally outward of the power hub.

11. A mount configured to connect an image capture device to an accessory, the mount comprising:
    a female component configured for connection to the accessory; and
    a male component configured for removable insertion into the female component, the male component including:
       a body;
       a first interconnect mechanism supported by the body and configured to interface with a corresponding second interconnect mechanism on the image capture device to facilitate removable connection of the image capture device and the mount;
       arms supported by the body and configured to releasably connect the male component to the female component; and
       a power hub supported by the body and configured to receive a power cord to thereby deliver power to the mount.

12. The mount of claim 11, wherein the power hub includes a first electrical contact configured for engagement with a second electrical contact on the power cord to thereby facilitate power and/or data delivery to the mount.

13. The mount of claim 11, wherein the arms are resiliently deflectable between an engaged position, in which the arms secure the male component within the female component, and a disengaged position, in which the male component is removable from the female component.

14. The mount of claim 13, wherein the power hub is positioned such that, upon connection of the power cord to the power hub, the power cord inhibits repositioning of the arms from the engaged position into the disengaged position.

15. The mount of claim 14, wherein the power hub is located between the arms.

16. A mount configured to connect an image capture device to an accessory such that the image capture device is movable in relation to the mount about an articulation joint, wherein the mount and the image capture device include corresponding electrical interfaces configured for direct contact to facilitate power and/or data communication to and/or from the image capture device through the articulation joint upon connection of the mount and the image capture device.

17. The mount of claim 16, wherein the corresponding electrical interfaces include:
   a first electrical interface; and
   a second electrical interface configured for connection to the first electrical interface, wherein the first electrical interface includes contact pads, and the second electrical interface includes connector pins configured for engagement with the contact pads.

18. The mount of claim 17, wherein the first electrical interface is included on the image capture device, and the second electrical interface is included on the mount.

19. The mount of claim 17, wherein the second electrical interface is reconfigurable between an expanded configuration and a compressed configuration.

20. The mount of claim 19, wherein the second electrical interface is biased towards the expanded configuration such that a biasing force is created in the second electrical interface upon connection of the image capture device and the mount that maintains electrical connection of the first electrical interface and the second electrical interface while allowing for relative movement between the image capture device and the mount.

* * * * *